United States Patent
Yoshihara et al.

(10) Patent No.: US 11,618,833 B2
(45) Date of Patent: Apr. 4, 2023

(54) INK COMPOSITION, PRODUCTION METHOD THEREFOR, LIGHT CONVERSION LAYER, AND COLOR FILTER

(71) Applicant: DIC CORPORATION, Tokyo (JP)

(72) Inventors: Sunao Yoshihara, Sakura (JP); Takayuki Miki, Sakura (JP); Hirotomo Sasaki, Sakura (JP); Ikuro Kiyoto, Sakura (JP); Minoru Tabuchi, Sakura (JP)

(73) Assignee: DIC CORPORATION, Tokyo (JP)

( * ) Notice: Subject to any disclaimer, the term of this patent is extended or adjusted under 35 U.S.C. 154(b) by 544 days.

(21) Appl. No.: 16/629,128

(22) PCT Filed: Jul. 19, 2018

(86) PCT No.: PCT/JP2018/027065
§ 371 (c)(1),
(2) Date: Jan. 7, 2020

(87) PCT Pub. No.: WO2019/017424
PCT Pub. Date: Jan. 24, 2019

(65) Prior Publication Data
US 2020/0224047 A1    Jul. 16, 2020

(30) Foreign Application Priority Data
Jul. 21, 2017 (JP) .............................. JP2017-142152

(51) Int. Cl.
*C09D 11/322* (2014.01)
*C09D 11/38* (2014.01)
(Continued)

(52) U.S. Cl.
CPC .......... *C09D 11/322* (2013.01); *C09D 11/32* (2013.01); *C09D 11/38* (2013.01); *G02B 5/20* (2013.01);
(Continued)

(58) Field of Classification Search
CPC ....... C09D 11/32; C09D 11/322; C09D 11/38; C09D 11/101; G02B 5/20; G02B 5/206; G02B 5/207
(Continued)

(56) References Cited

U.S. PATENT DOCUMENTS

2005/0008970 A1*  1/2005  Oshima ................ B41C 1/1008
                                                        430/270.1
2005/0238798 A1   10/2005  Mitsuya et al.
(Continued)

FOREIGN PATENT DOCUMENTS

JP    2005-302516 A    10/2005
JP    2016-501430 A     1/2016
(Continued)

*Primary Examiner* — Ruiyun Zhang
(74) *Attorney, Agent, or Firm* — WHDA, LLP

(57) ABSTRACT

The present invention provides an ink composition containing light-emitting nanocrystal particles and a photopolymerizable compound, wherein the photopolymerizable compound has a Log P value in the range of −1.5 to 7.0. The present invention also provides an ink composition containing light-emitting nanocrystal particles and a photopolymerizable compound, wherein the photopolymerizable compound has a Log P value in the range of −1.0 to 6.5, and the ink composition has a water ($H_2O$) content of 90 ppm or less measured with a Karl Fischer moisture meter. The present invention also provides a light conversion layer including a plurality of pixel units, wherein the plurality of pixel units include a pixel unit containing a cured product of the ink composition, and the light conversion layer is formed of the cured product of the ink composition. The present invention also provides a color filter including the light conversion layer.

17 Claims, 1 Drawing Sheet

(51) Int. Cl.
*G02B 5/20* (2006.01)
*C09D 11/32* (2014.01)
*C09D 11/101* (2014.01)

(52) U.S. Cl.
CPC ............ *G02B 5/206* (2013.01); *G02B 5/207* (2013.01); *C09D 11/101* (2013.01)

(58) Field of Classification Search
USPC ..................................................... 106/31.65
See application file for complete search history.

(56) References Cited

U.S. PATENT DOCUMENTS

| | | |
|---|---|---|
| 2008/0093986 A1 | 4/2008 | Inoue et al. |
| 2009/0035535 A1* | 2/2009 | Wachi ................. C09D 11/101 427/256 |
| 2014/0027673 A1 | 1/2014 | Nick et al. |
| 2015/0299562 A1 | 10/2015 | Buchholz et al. |
| 2016/0264794 A1* | 9/2016 | Takiguchi ............ C09D 11/107 |
| 2017/0198149 A1 | 7/2017 | Yamada et al. |
| 2017/0232718 A1 | 8/2017 | Iwase |
| 2018/0099480 A1 | 4/2018 | Kusumoto et al. |

FOREIGN PATENT DOCUMENTS

| | | |
|---|---|---|
| WO | 2006/070711 A1 | 7/2006 |
| WO | 2013/122820 A1 | 8/2013 |
| WO | 2016/052627 A1 | 4/2016 |
| WO | 2016/076069 A1 | 5/2016 |
| WO | 2016/204181 A1 | 12/2016 |

* cited by examiner

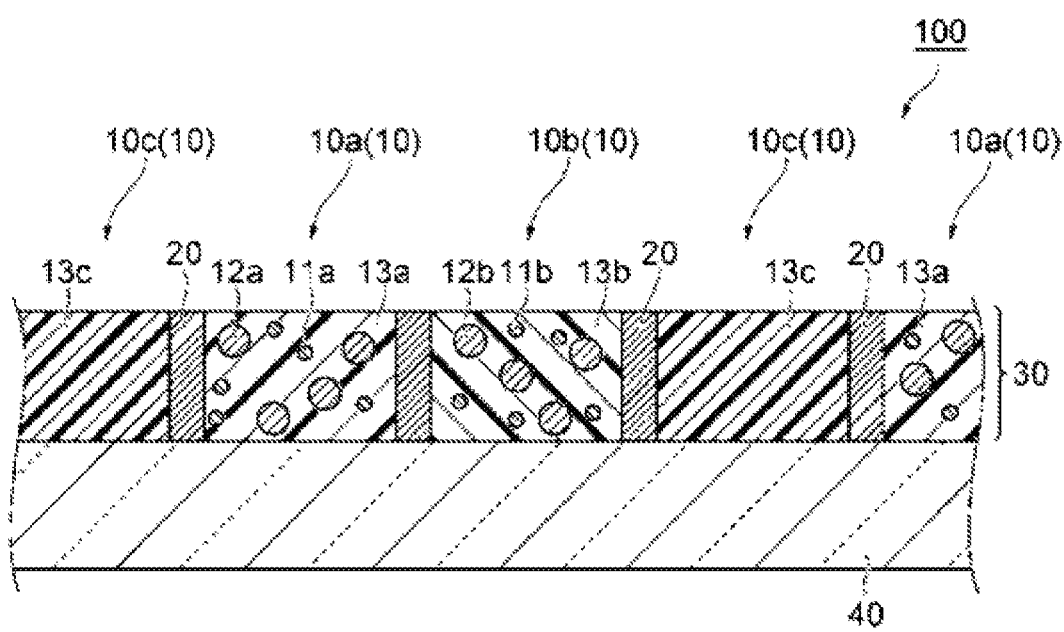

INK COMPOSITION, PRODUCTION METHOD THEREFOR, LIGHT CONVERSION LAYER, AND COLOR FILTER

TECHNICAL FIELD

The present invention relates to an ink composition, a method for producing the ink composition, a light conversion layer, and a color filter.

BACKGROUND ART

Color filter pixel units of displays, such as liquid crystal displays, have been produced, for example, by photolithography from curable resist materials containing red organic pigment particles or green organic pigment particles and alkali-soluble resins and/or acrylic monomers.

With recent strong demands for displays with lower power consumption, a method for forming a color filter pixel unit, such as red pixels or green pixels, has been actively studied, for example, using light-emitting nanocrystal particles, such as quantum dots, quantum rods, or other inorganic fluorescent particles, instead of the red organic pigment particles or green organic pigment particles.

Due to the characteristics of such a method for producing a color filter by photolithography, however, the production method has the drawback of wasting resist materials other than pixel units including relatively expensive light-emitting nanocrystal particles. Under such circumstances, to avoid such a waste of resist materials, the formation of a pixel unit of a light conversion substrate by an ink jet method is beginning to be studied.

It is known that various photopolymerizable compounds are used in such ink compositions. However, there is no knowledge as to what kind of characteristics a photopolymerizable compound should specifically satisfy to make a light conversion layer formed of a cured product thereof free from defects. Thus, practically, a photopolymerizable compound is cured to form a light conversion layer, and various characteristics of the light conversion layer are determined to check for the presence of defects through trial and error.

Furthermore, inks containing quantum dots formed of light-emitting nanocrystal particles are sometimes degraded by penetration of atmospheric water.

Patent Literature 1 discloses a preparation containing a solvent saturated or supersaturated with an inert gas and a functional organic material and also discloses a preparation in which the total amount of oxygen and water is below a certain level.

PTL 1, however, does not describe the use of a photocurable compound.

PTL 1 does not describe actual measurement data of the water content, and the effects of the water content are unknown.

Although the effects of the atmosphere on an organic light-emitting material for OLEDs are described in an example, whether specific technical effects on quantum dots formed of light-emitting nanocrystal particles are produced or not is not disclosed, and the degree of specific technical effects on quantum dots is unknown. Furthermore, a light-emitting material for OLEDs described in an example has no wavelength conversion function and cannot be used for a light conversion layer formed of quantum dots.

When a solvent saturated or supersaturated with an inert gas is used, and a coating liquid is transferred with a pump to a coater head or a nozzle for coating, bubbles are formed in the flow path of the coating liquid and enter the coating liquid, thus resulting in a poorly coated object. When the solvent is used in ink jet inks, there is also a great problem that bubbles are formed in a print head of an ink jet printer and cause ejection failure.

PTL 2 discloses a composition containing quantum dots substantially free of water. PTL 2, however, does not describe actual measurement data of the water content, and the effective water content is unknown.

PTL 2 does not describe an IJ method and also does not describe the application of a light conversion layer to a color filter (CF) for LCDs.

In the IJ method, an ink is ejected from a print head nozzle into the atmosphere, is exposed to atmospheric water, and is exposed to the atmosphere after printing. Because CF substrates have a large area, the formation of an inert gas atmosphere free of water near a head or on a printing surface of a print substrate greatly increases the equipment costs and running costs. Thus, there is a demand for inks that cause less performance degradation of quantum dots even when exposed to atmospheric moisture.

Thus, there is a demand for inks that suffer less degradation of quantum dots and that form a smaller number of bubbles during liquid transfer or in an IJ head.

PTL 3 discloses the removal of oxygen by introducing an inert gas to expel dissolved oxygen and discloses degassing under reduced pressure. PTL 3 also discloses that light emission from a quantum dot (QD) composition without oxygen is less susceptible to degradation.

When an IJ printing ink or a cured ink film is exposed to the atmosphere, however, QDs are exposed to atmospheric water. In such a case, known methods cannot prevent degradation. Thus, there is a demand for a QD composition or a cured product thereof that is advantageous to IJ printing.

Although PTL 2 and PTL 3 describe acrylate monomers and oligomers that can be used as photocurable compounds, monomers that are actually used in experiments are only di(meth)acrylates with a long-chain alkylene atomic group, such as dodecanediol di(meth)acrylate.

CITATION LIST

Patent Literature

PTL 1: Japanese Unexamined Patent Application Publication (Translation of PCT Application) No. 2016-501430

PTL 2: U.S. Patent Application Publication No. 2014/0027673

PTL 3: WO 2013/122820

SUMMARY OF INVENTION

Technical Problem

An ink composition containing light-emitting nanocrystal particles and a light conversion layer formed of the ink composition are sensitive to atmospheric water and need to be improved in stability.

It is an object of the present invention to provide an ink composition with improved resistance to water, a method for producing the ink composition, and a light conversion layer and a color filter produced from the ink composition.

Solution to Problem

The present invention provides the inventions of the following aspects.

An ink composition described below in 1 contains as a photopolymerizable compound a photopolymerizable compound with a Log P value in a particular range. Thus, a cured product of the ink composition has no defect and can have improved stability in the atmosphere, for example.

1. An ink composition containing light-emitting nanocrystal particles and a photopolymerizable compound, wherein the photopolymerizable compound has a Log P value in the range of −1.0 to 6.5.

2. An ink composition containing light-emitting nanocrystal particles and a photopolymerizable compound, wherein the photopolymerizable compound has a Log P value in the range of −1.0 to 6.5, and the ink composition has a water ($H_2O$) content of 90 ppm or less measured with a Karl Fischer moisture meter.

3. An ink jet ink composition containing light-emitting nanocrystal particles and a photopolymerizable compound, wherein the photopolymerizable compound has a Log P value in the range of −1.0 to 6.5, and the ink jet ink composition has a water ($H_2O$) content of 90 ppm or less measured with a Karl Fischer moisture meter.

4. A method for producing the ink jet ink composition according to 3, including removing dissolved gas from the ink composition under reduced pressure.

5. The ink composition according to 3, wherein the water ($H_2O$) content is 20 ppm or less.

6. The method for producing the ink composition according to 4, wherein a photopolymerizable compound dehydrated with a molecular sieve is used.

7. The ink composition according to 3 or 5, containing a molecular sieve.

8. The ink jet ink composition according to any one of 3, 5, and 7, wherein the photopolymerizable compound is a radical photopolymerizable compound.

9. The ink jet ink composition according to any one of 3, 5, and 7, wherein the photopolymerizable compound is alkali-insoluble.

10. The ink jet ink composition according to any one of 3, 5, and 7, wherein an alkali-insoluble coating film can be formed.

11. The ink jet ink composition according to any one of 3, 5, and 7, wherein the ink jet ink composition has a surface tension in the range of 20 to 40 mN/m.

12. The ink jet ink composition according to any one of 3, 5, and 7, wherein the ink jet ink composition has a viscosity in the range of 2 to 20 mPa·s.

13. The ink jet ink composition according to any one of 3, 5, and 7, further containing an organic solvent with a boiling point of 180° C. or more.

14. The ink jet ink composition according to any one of 3, 5, and 7 for use in a color filter.

15. A light conversion layer containing a cured product of the ink composition according to any one of 1 to 3.

16. A light conversion layer containing a cured product of the ink composition according to any one of 1 to 3, wherein the light conversion layer is alkali-insoluble.

17. A light conversion layer including a plurality of pixel units,
wherein the plurality of pixel units include a pixel unit containing a cured product of the ink jet ink composition according to any one of 3, 5, and 7.

18. The light conversion layer according to any one of 15 to 17, further including a light-shielding portion between the plurality of pixel units,
wherein the plurality of pixel units include
a first pixel unit that contains the cured product and contains, as the light-emitting nanocrystal particles, light-emitting nanocrystal particles that absorb light with a wavelength in the range of 420 to 480 nm and emit light with an emission peak wavelength in the range of 605 to 665 nm, and
a second pixel unit that contains the cured product and contains, as the light-emitting nanocrystal particles, light-emitting nanocrystal particles that absorb light with a wavelength in the range of 420 to 480 nm and emit light with an emission peak wavelength in the range of 500 to 560 nm.

19. The light conversion layer according to any one of 15 to 18, wherein
the plurality of pixel units further include a third pixel unit with a light transmittance of 30% or more at a wavelength in the range of 420 to 480 nm.

20. A color filter including the light conversion layer according to any one of 15 to 19.

Advantageous Effects of Invention

The present invention can provide an ink composition with improved stability in the atmosphere, a method for producing the ink composition, and a light conversion layer and a color filter produced from the ink composition.

BRIEF DESCRIPTION OF DRAWINGS

FIG. 1 is a schematic cross-sectional view of a color filter according to an embodiment of the present invention.

DESCRIPTION OF EMBODIMENTS

The embodiments of the present invention are described in detail below.
<Ink Composition>

An ink composition according to an embodiment contains light-emitting nanocrystal particles and a photopolymerizable compound, wherein the photopolymerizable compound has a Log P value in the range of −1.0 to 6.5.

For example, an ink composition according to an embodiment is an ink composition for use in a color filter, which is used to form a pixel unit of the color filter by photolithography, by an ink jet method, or by another method.

An ink composition according to an embodiment is suitable to form a color filter pixel unit by an ink jet method.

When a known ink composition is used to form a color filter pixel unit, for example, by an ink jet method, exposure to atmospheric water degrades a light conversion layer.

An ink composition according to the present embodiment can solve such a problem.

An ink composition for a color filter for use in an ink jet method (an ink jet ink for a color filter) is described below as an example.
[Light-Emitting Nanocrystal Particles]

Light-emitting nanocrystal particles are nanoscale crystals that absorb excitation light and emit fluorescence or phosphorescence, and are crystals that have a maximum particle size of 100 nm or less measured, for example, with a transmission electron microscope or a scanning electron microscope.

For example, light-emitting nanocrystal particles can absorb light with a specified wavelength and emit light with a wavelength different from the absorption wavelength (fluorescence or phosphorescence). Light-emitting nanocrystal particles may be red-light-emitting nanocrystal particles, which emit light with an emission peak wavelength in the range of 605 to 665 nm (red light), green-light-emitting nanocrystal particles, which emit light with an emission peak wavelength in the range of 500 to 560 nm (green light), or blue-light-emitting nanocrystal particles, which emit light with an emission peak wavelength in the range of 420 to 480 nm (blue light). In one embodiment, the ink composition preferably contains at least one type of light-emitting nanocrystal particles selected from these light-emitting nanocrystal particles. Light absorbed by the light-emitting nanocrystal particles may be light with a wavelength in the range of 400 nm or more and less than 500 nm (blue light) or light with a wavelength in the range of 200 to 400 nm (ultraviolet light), for example. The emission peak wavelength of the light-emitting nanocrystal particles can be determined in a fluorescence spectrum or a phosphorescence spectrum measured with an ultraviolet-visible spectrophotometer, for example.

The red-light-emitting nanocrystal particles preferably have an emission peak wavelength of 665 nm or less, 663 nm or less, 660 nm or less, 658 nm or less, 655 nm or less, 653 nm or less, 651 nm or less, 650 nm or less, 647 nm or less, 645 nm or less, 643 nm or less, 640 nm or less, 637 nm or less, 635 nm or less, 632 nm or less, or 630 nm or less, and preferably have an emission peak wavelength of 628 nm or more, 625 nm or more, 623 nm or more, 620 nm or more, 615 nm or more, 610 nm or more, 607 nm or more, or 605 nm or more. Any of these upper limits and lower limits may be combined. Also in the following similar description, any of each upper limit and each lower limit may be combined.

The green-light-emitting nanocrystal particles preferably have an emission peak wavelength of 560 nm or less, 557 nm or less, 555 nm or less, 550 nm or less, 547 nm or less, 545 nm or less, 543 nm or less, 540 nm or less, 537 nm or less, 535 nm or less, 532 nm or less, or 530 nm or less, and preferably have an emission peak wavelength of 528 nm or more, 525 nm or more, 523 nm or more, 520 nm or more, 515 nm or more, 510 nm or more, 507 nm or more, 505 nm or more, 503 nm or more, or 500 nm or more.

The blue-light-emitting nanocrystal particles preferably have an emission peak wavelength of 480 nm or less, 477 nm or less, 475 nm or less, 470 nm or less, 467 nm or less, 465 nm or less, 463 nm or less, 460 nm or less, 457 nm or less, 455 nm or less, 452 nm or less, or 450 nm or less, and preferably have an emission peak wavelength of 450 nm or more, 445 nm or more, 440 nm or more, 435 nm or more, 430 nm or more, 428 nm or more, 425 nm or more, 422 nm or more, or 420 nm or more.

The wavelength (emission color) of light emitted by the light-emitting nanocrystal particles depends on the size (for example, particle size) of the light-emitting nanocrystal particles according to the solution of the Schrodinger wave equation of a potential well model and also depends on the energy gap of the light-emitting nanocrystal particles. Thus, the constituent material and size of the light-emitting nanocrystal particles to be used can be changed to determine the emission color.

The light-emitting nanocrystal particles may be light-emitting nanocrystal particles containing a semiconductor material (light-emitting semiconductor nanocrystal particles). The light-emitting semiconductor nanocrystal particles may be quantum dots (hereinafter referred to as "QDs") or quantum rods. Among these, quantum dots are preferred in terms of emission spectrum controllability, reduced production costs with consistent reliability, and improved mass productivity.

The light-emitting semiconductor nanocrystal particles may be composed entirely of a core containing a first semiconductor material or may be composed of a core containing the first semiconductor material and a shell containing a second semiconductor material, which is different from the first semiconductor material, the shell covering at least part of the core. In other words, the light-emitting semiconductor nanocrystal particles may have a structure composed entirely of a core (core structure) or composed of a core and a shell (core/shell structure). Alternatively, the light-emitting semiconductor nanocrystal particles may further have a shell containing a third semiconductor material different from the first and second semiconductor materials (second shell) in addition to the shell containing the second semiconductor material (first shell), the second shell covering at least part of the core. In other words, the light-emitting semiconductor nanocrystal particles may have a structure composed of the core, the first shell, and the second shell (core/shell/shell structure). Each of the core and the shells may be formed of mixed crystals containing two or more semiconductor materials (for example, CdSe+CdS, CIS+ZnS, etc.).

The light-emitting nanocrystal particles preferably contain, as a semiconductor material, at least one semiconductor material selected from the group consisting of group II-VI semiconductors, group III-V semiconductors, group I-III-VI semiconductors, group IV semiconductors, and group I-II-IV-VI semiconductors.

Specific semiconductor materials include CdS, CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, CdHgZnTe, CdZnSeS, CdZnSeTe, CdZnSTe, CdHgSeS, CdHgSeTe, CdHgSTe, HgZnSeS, HgZnSeTe, HgZnSTe; GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb; SnS, SnSe, SnTe, PbS, PbSe, PbTe, SnSeS, SnSeTe, SnSTe, PbSeS, PbSeTe, PbSTe, SnPbS, SnPbSe, SnPbSe, SnPbSSe, SnPbSeTe, SnPbSTe; Si, Ge, SiC, SiGe, AgInSe$_2$, CuGaSe$_2$, CuInS$_2$, CuGaS$_2$, CuInSe$_2$, AgInS$_2$, AgGaSe$_2$, AgGaS$_2$, C, Si, and Ge. The light-emitting semiconductor nanocrystal particles preferably contain at least one selected from the group consisting of CdS, CdSe, CdTe, ZnS, ZnSe, ZnTe, ZnO, HgS, HgSe, HgTe, InP, InAs, InSb, GaP, GaAs, GaSb, AgInS$_2$, AgInSe$_2$, AgInTe$_2$, AgGaS$_2$, AgGaSe$_2$, AgGaTe$_2$, CuInS$_2$, CuInSe$_2$, CuInTe$_2$, CuGaS$_2$, CuGaSe$_2$, CuGaTe$_2$, Si, C, Ge, and Cu$_2$ZnSnS$_4$, in terms of emission spectrum controllability, reduced production costs with consistent reliability, and improved mass productivity.

For example, the red-light-emitting semiconductor nanocrystal particles are CdSe nanocrystal particles, CdSe rod-shaped nanocrystal particles, rod-shaped nanocrystal particles with a core-shell structure, the shell being CdS and the inner core being CdSe, rod-shaped nanocrystal particles with a core-shell structure, the shell being CdS and the inner core being ZnSe, nanocrystal particles with a core-shell structure, the shell being CdS and the inner core being CdSe, nanocrystal particles with a core-shell structure, the shell being CdS and the inner core being ZnSe, CdSe/ZnS mixed crystal nanocrystal particles, CdSe/ZnS mixed crystal rod-shaped nanocrystal particles, InP nanocrystal particles, InP nanocrystal particles, InP rod-shaped nanocrystal particles, CdSe/CdS mixed crystal nanocrystal particles, CdSe/CdS mixed crystal rod-shaped nanocrystal particles, ZnSe/CdS mixed crystal nanocrystal particles, or ZnSe/CdS mixed crystal rod-shaped nanocrystal particles.

For example, the green-light-emitting semiconductor nanocrystal particles may be CdSe nanocrystal particles, CdSe rod-shaped nanocrystal particles, CdSe/ZnS mixed crystal nanocrystal particles, or CdSe/ZnS mixed crystal rod-shaped nanocrystal particles.

For example, the blue-light-emitting semiconductor nanocrystal particles may be ZnSe nanocrystal particles, ZnSe rod-shaped nanocrystal particles, ZnS nanocrystal particles, ZnS rod-shaped nanocrystal particles, nanocrystal particles with a core-shell structure, the shell being ZnSe and the inner core being ZnS, rod-shaped nanocrystal particles with a core-shell structure, the shell being ZnSe and the inner core being ZnS, CdS nanocrystal particles, or CdS rod-shaped nanocrystal particles. The color of light emitted by semiconductor nanocrystal particles with a fixed chemical composition can be altered to red or green by changing the average particle size of the semiconductor nanocrystal particles. Semiconductor nanocrystal particles by themselves preferably have minimal adverse effects on human bodies. When semiconductor nanocrystal particles containing cadmium, selenium, or the like are used as light-emitting nanocrystal particles, semiconductor nanocrystal particles containing minimal amounts of these elements (cadmium, selenium, etc.) are preferably used alone, or the semiconductor nanocrystal particles are preferably used in combination with other light-emitting nanocrystal particles to decrease the amounts of these elements.

The light-emitting nanocrystal particles may have any shape, may have any geometrical shape, and may have any irregular shape. For example, the light-emitting nanocrystal particles may be spherical, ellipsoidal, pyramid-shaped, discoid, branched, netlike, or rod-shaped. The light-emitting nanocrystal particles preferably have less directional shapes (for example, spherical, regular tetrahedral, etc.) to improve the uniformity and fluidity of the ink composition.

The light-emitting nanocrystal particles may have an average particle size (volume-average size) of 1 nm or more, 1.5 nm or more, or 2 nm or more in terms of easy light emission at a desired wavelength and high dispersibility and storage stability. The light-emitting nanocrystal particles may have an average particle size of 40 nm or less, 30 nm or less, or 20 nm or less in terms of easy light emission at a desired wavelength. The average particle size (volume-average size) of the light-emitting nanocrystal particles can be measured with a transmission electron microscope or a scanning electron microscope and can be calculated as a volume-average size.

The light-emitting nanocrystal particles preferably have an organic ligand on their surfaces in terms of dispersion stability. For example, the organic ligand may be coordinated with the surfaces of the light-emitting nanocrystal particles. In other words, the surfaces of the light-emitting nanocrystal particles may be passivated by the organic ligand. The light-emitting nanocrystal particles may have a polymer dispersant on their surfaces. In one embodiment, for example, the organic ligand may be removed from the light-emitting nanocrystal particles having the organic ligand, and the organic ligand may be replaced with a polymer dispersant to bond the polymer dispersant to the surfaces of the light-emitting nanocrystal particles. With respect to the dispersion stability of an ink jet ink, the light-emitting nanocrystal particles coordinated with the polymer dispersant is preferred to the light-emitting nanocrystal particles coordinated with the organic ligand.

Examples of the organic ligand include trioctylphosphine (TOP), trioctylphosphine oxide (TOPO), oleic acid, oleylamine, octylamine, trioctylamine, hexadecylamine, octanethiol, dodecanethiol, hexylphosphonic acid (HPA), tetradecylphosphonic acid (TDPA), and octylphosphinic acid (OPA).

The light-emitting nanocrystal particles may be dispersed in colloidal form in an organic solvent or in a photopolymerizable compound. The surfaces of the light-emitting nanocrystal particles dispersed in an organic solvent are preferably passivated by the organic ligand. Examples of the organic solvent include cyclohexane, hexane, heptane, chloroform, toluene, octane, chlorobenzene, tetralin, diphenyl ether, propylene glycol monomethyl ether acetate, butyl carbitol acetate, and mixtures thereof.

The light-emitting nanocrystal particles may be a commercial product. Examples of commercial products of the light-emitting nanocrystal particles include indium phosphide/zinc sulfide, D-dots, and CuInS/ZnS each manufactured by NN-Labs, and InP/ZnS manufactured by Aldrich.

To enhance the effect of reducing leakage light, the light-emitting nanocrystal particle content may be 5% or more by mass, 10% or more by mass, 15% or more by mass, 20% or more by mass, 30% or more by mass, or 40% or more by mass of the mass of the non-volatile matter of the ink composition. The light-emitting nanocrystal particle content may be 70% or less by mass, 60% or less by mass, 55% or less by mass, or 50% or less by mass of the mass of the non-volatile matter of the ink composition in terms of high ejection stability. The term "the mass of the non-volatile matter of the ink composition", as used herein, refers to the total mass of the ink composition excluding the mass of the organic solvent when the ink composition contains the organic solvent, or the total mass of the ink composition when the ink composition contains no organic solvent.

The light-emitting nanocrystal particles have surface atoms that can function as coordination sites and therefore have high reactivity. Due to their high reactivity and higher surface area than common pigments, the light-emitting nanocrystal particles tend to agglomerate. Because the light-emitting nanocrystal particles emit light due to the quantum size effect, agglomeration of the particles causes a quenching phenomenon, decreases the fluorescence quantum yield, and decreases luminance and color reproducibility. In contrast, in the present embodiment, the ink composition contains a polymer dispersant, which potentially prevents agglomeration of the light-emitting nanocrystal particles. Thus, in the present embodiment, the light-emitting nanocrystal particle content may be in the above ranges.

[Light-Scattering Particles]

An ink composition according to an embodiment may contain light-scattering particles. When a color filter pixel unit (hereinafter also referred to simply as "pixel unit") is formed of an ink composition containing light-emitting nanocrystal particles, light from a light source is sometimes not absorbed by the light-emitting nanocrystal particles and leaks through the pixel unit. Such leakage light decreases the color reproducibility of the pixel unit. Thus, when the pixel unit is used in a light conversion layer, leakage light is preferably minimized. The light-scattering particles are suitable to prevent leakage light from the pixel unit. For example, the light-scattering particles are optically inactive inorganic fine particles. The light-scattering particles can scatter light emitted from a light source toward a color filter pixel unit.

Examples of materials constituting the light-scattering particles include metal elements, such as tungsten, zirconium, titanium, platinum, bismuth, rhodium, palladium, silver, tin, platinum, and gold; metal oxides, such as silica, barium sulfate, barium carbonate, calcium carbonate, talc, titanium oxide, clay, kaolin, barium sulfate, barium carbonate, calcium carbonate, white fused alumina, titanium oxide, magnesium oxide, barium oxide, aluminum oxide, bismuth oxide, zirconium oxide, and zinc oxide; metal carbonates, such as magnesium carbonate, barium carbonate, bismuth subcarbonate, and calcium carbonate; metal hydroxides, such as aluminum hydroxide; composite oxides, such as barium zirconate, calcium zirconate, calcium titanate, barium titanate, and strontium titanate, and metal salts, such as bismuth subnitrate. To enhance the effect of reducing leakage light, the light-scattering particles preferably contain at least one selected from the group consisting of titanium oxide, alumina, zirconium oxide, zinc oxide, calcium carbonate, barium sulfate, and silica, more preferably at least one selected from the group consisting of titanium oxide, barium sulfate, and calcium carbonate.

The shape of the light-scattering particles may be spherical, filamentary, or amorphous. The light-scattering particles preferably have less directional shapes (for example, spherical, regular tetrahedral, etc.) to improve the uniformity, fluidity, and light scattering of the ink composition.

To enhance the effect of reducing leakage light, the average particle size (volume-average size) of the light-scattering particles in the ink composition may be 0.05 μm or more, 0.2 μm or more, or 0.3 μm or more. The average particle size (volume-average size) of the light-scattering particles in the ink composition may be 1.0 μm or less, 0.6 μm or less, or 0.4 μm or less in terms of high ejection stability. The average particle size (volume-average size) of the light-scattering particles in the ink composition may range from 0.05 to 1.0 μm, 0.05 to 0.6 μm, 0.05 to 0.4 μm, 0.2 to 1.0 μm, 0.2 to 0.6 μm, 0.2 to 0.4 μm, 0.3 to 1.0 μm, 0.3 to 0.6 μm, or 0.3 to 0.4 μm. To easily achieve such an average particle size (volume-average size), the average particle size (volume-average size) of the light-scattering particles to be used may be 50 nm or more and may be 1000 nm or less. The average particle size (volume-average size) of the light-scattering particles can be measured with a dynamic light-scattering Nanotrac particle size distribution analyzer and can be calculated as a volume-average size. The average particle size (volume-average size) of the light-scattering particles to be used can be determined, for example, by measuring the particle size of each particle with a transmission electron microscope or a scanning electron microscope and calculating the volume-average size.

To enhance the effect of reducing leakage light, the light-scattering particle content may be 0.1% or more by mass, 1% or more by mass, 5% or more by mass, 7% or more by mass, 10% or more by mass, or 12% or more by mass of the mass of the non-volatile matter of the ink composition. To enhance the effect of reducing leakage light and in terms of high ejection stability, the light-scattering particle content may be 60% or less by mass, 50% or less by mass, 40% or less by mass, 30% or less by mass, 25% or less by mass, 20% or less by mass, or 15% or less by mass of the mass of the non-volatile matter of the ink composition. In the present embodiment, the ink composition contains a polymer dispersant, which can uniformly disperse the light-scattering particles even at the light-scattering particle content in the above range.

The mass ratio of the light-scattering particle content to the light-emitting nanocrystal particle content (light-scattering particles/light-emitting nanocrystal particles) ranges from 0.1 to 5.0. To enhance the effect of reducing leakage light, the mass ratio (light-scattering particles/light-emitting nanocrystal particles) may be 0.2 or more or 0.5 or more. To enhance the effect of reducing leakage light and in terms of good continuous ejection properties during ink jet printing, the mass ratio (light-scattering particles/light-emitting nanocrystal particles) may be 2.0 or less or 1.5 or less. The mass ratio (light-scattering particles/light-emitting nanocrystal particles) may range from 0.1 to 2.0, 0.1 to 1.5, 0.2 to 5.0, 0.2 to 2.0, 0.2 to 1.5, 0.5 to 5.0, 0.5 to 2.0, or 0.5 to 1.5. The light-scattering particles probably reduce leakage light by the following mechanism. In the absence of the light-scattering particles, backlight only travels straight through a pixel unit and is less likely to be absorbed by the light-emitting nanocrystal particles. By contrast, in the presence of the light-scattering particles in a pixel unit containing the light-emitting nanocrystal particles, backlight is scattered in all directions in the pixel unit and can be received by the light-emitting nanocrystal particles, thus resulting in increased light absorption in the pixel unit even using the same backlight. Consequently, such a mechanism can prevent leakage light.

[Polymer Dispersant]

An ink composition according to an embodiment preferably contains a polymer dispersant. The polymer dispersant can more uniformly disperse light-scattering particles in the ink.

In the present invention, the polymer dispersant is a polymer that has a weight-average molecular weight of 750 or more and that has a functional group with an affinity for light-scattering particles, and has a function of dispersing light-scattering particles. The polymer dispersant adsorbs to light-scattering particles via a functional group with an affinity for the light-scattering particles and disperses the light-scattering particles in the ink composition by electrostatic repulsion and/or steric repulsion between polymer dispersant molecules. The polymer dispersant is preferably bonded to and adsorbs to the surfaces of light-scattering particles, and may be bonded to and adsorb to the surfaces of light-emitting nanocrystal particles, or may be free in the ink composition.

The functional group with an affinity for light-scattering particles may be an acidic functional group, a basic functional group, or a nonionic functional group. The acidic functional group has a dissociative proton and may be neutralized with a base, such as an amine or a hydroxide ion. The basic functional group may be neutralized with an acid, such as an organic acid or an inorganic acid.

Examples of the acidic functional group include a carboxy group (-COOH), a sulfo group ($—SO_3H$), a sulfate group ($—OSO_3H$), a phosphonate group ($—PO(OH)_3$), a phosphate group ($—OPO(OH)_3$), a phosphinate group ($—PO(OH)—$), and a mercapto group (—SH).

Examples of the basic functional group include primary, secondary, and tertiary amino groups, an ammonium group, an imino group, and nitrogen-containing heterocyclic groups, such as pyridine, pyrimidine, pyrazine, imidazole, and triazole.

Examples of the nonionic functional group include a hydroxy group, an ether group, a thioether group, a sulfinyl group (—SO—), a sulfonyl group ($—SO_2—$), a carbonyl group, a formyl group, an ester group, a carbonate group, an amide group, a carbamoyl group, a ureido group, a thioamide group, a thioureido group, a sulfamoyl group, a cyano group, an alkenyl group, an alkynyl group, a phosphine oxide group, and a phosphine sulfide group.

In terms of the dispersion stability of light-scattering particles, reduction in side effects of sedimentation of light-emitting nanocrystal particles, the ease of synthesis of a polymer dispersant, and the stability of a functional group, the acidic functional group is preferably a carboxy group, a sulfo group, a phosphonate group, or a phosphate group, and the basic functional group is preferably an amino group. Among these, a carboxy group, a phosphonate group, and an amino group are more preferred, and an amino group is most preferred.

A polymer dispersant with an acidic functional group has an acid value. A polymer dispersant with an acidic functional group preferably has an acid value in the range of 1 to 150 mgKOH/g based on the solid content. An acid value of 1 or more tends to result in sufficient dispersibility of light-scattering particles. An acid value of 150 or less results in a smaller decrease in storage stability of a pixel unit (a cured product of the ink composition).

A polymer dispersant with a basic functional group has an amine value. A polymer dispersant with a basic functional group preferably has an amine value in the range of 1 to 200 mgKOH/g based on the solid content. An amine value of 1 or more tends to result in sufficient dispersibility of light-scattering particles. An amine value of 200 or less results in a smaller decrease in storage stability of a pixel unit (a cured product of the ink composition).

The polymer dispersant may be a polymer of a single monomer (homopolymer) or a copolymer of multiple types of monomers (copolymer). The polymer dispersant may be a random copolymer, a block copolymer, or a graft copolymer. When the polymer dispersant is a graft copolymer, the polymer dispersant may be a comb-shaped graft copolymer or a star graft copolymer. Examples of the polymer dispersant include acrylic resins, polyester resins, polyurethane resins, polyamide resins, polyethers, phenolic resins, silicone resins, polyurea resins, amino resins, polyethyleneimines, polyamines, such as polyallylamine, epoxy resins, and polyimides.

The polymer dispersant may be commercial products, which include Ajisper PB series manufactured by Ajinomoto Fine-Techno Co., Inc., DISPERBYK series and BYK series manufactured by BYK, and Efka series manufactured by BASF.

Examples of the commercial products include "DISPERBYK-130", "DISPERBYK-161", "DISPERBYK-162", "DISPERBYK-163", "DISPERBYK-164", "DISPERBYK-166", "DISPERBYK-167", "DISPERBYK-168", "DISPERBYK-170", "DISPERBYK-171", "DISPERBYK-174", "DISPERBYK-180", "DISPERBYK-182", "DISPERBYK-183", "DISPERBYK-184", "DISPERBYK-185", "DISPERBYK-2000", "DISPERBYK-2001", "DISPERBYK-2008", "DISPERBYK-2009", "DISPERBYK-2020", "DISPERBYK-2022", "DISPERBYK-2025", "DISPERBYK-2050", "DISPERBYK-2070", "DISPERBYK-2096", "DISPERBYK-2150", "DISPERBYK-2155", "DISPERBYK-2163", "DISPERBYK-2164", "BYK-LPN21116", and "BYK-LPN6919" manufactured by BYK-Chemie; "EFKA4010", "EFKA4015", "EFKA4046", "EFKA4047", "EFKA4061", "EFKA4080", "EFKA4300", "EFKA4310", "EFKA4320", "EFKA4330", "EFKA4340", "EFKA4560", "EFKA4585", "EFKA5207", "EFKA1501", "EFKA1502", "EFKA1503", and "EFKA PX-4701" manufactured by BASF; "Solsperse 3000", "Solsperse 9000", "Solsperse 13240", "Solsperse 13650", "Solsperse 13940", "Solsperse 11200", "Solsperse 13940", "Solsperse 16000", "Solsperse 17000", "Solsperse 18000", "Solsperse 20000", "Solsperse 21000", "Solsperse 24000", "Solsperse 26000", "Solsperse 27000", "Solsperse 28000", "Solsperse 32000", "Solsperse 32500", "Solsperse 32550", "Solsperse 32600", "Solsperse 33000", "Solsperse 34750", "Solsperse 35100", "Solsperse 35200", "Solsperse 36000", "Solsperse 37500", "Solsperse 38500", "Solsperse 39000", "Solsperse 41000", "Solsperse 54000", "Solsperse 71000", and "Solsperse 76500" manufactured by Lubrizol Corporation; "Ajisper PB821", "Ajisper PB822", "Ajisper PB881", "PN411", and "PA111" manufactured by Ajinomoto Fine-Techno Co., Inc.; "TEGO Dispers 650", "TEGO Dispers 660C", "TEGO Dispers 662C", "TEGO Dispers 670", "TEGO Dispers 685", "TEGO Dispers 700", "TEGO Dispers 710", and "TEGO Dispers 760W" manufactured by Evonik Industries AG.; and "Disparlon DA-703-50", "DA-705", and "DA-725" manufactured by Kusumoto Chemicals, Ltd.

Apart from these commercial products, the polymer dispersant may be synthesized by copolymerization of a cationic monomer with a basic group and/or an anionic monomer with an acidic group, a monomer with a hydrophobic group, and another optional monomer (a nonionic monomer, a monomer with a hydrophilic group, etc.). More specifically, the cationic monomer, anionic monomer, monomer with a hydrophobic group, and other monomers may be monomers described in paragraphs 0034 to 0036 of Japanese Unexamined Patent Application Publication No. 2004-250502.

The polymer dispersant may preferably be a compound produced by a reaction between a polyalkyleneimine and a polyester compound described in Japanese Unexamined Patent Application Publication No. 54-37082 and Japanese Unexamined Patent Application Publication No. 61-174939, a compound produced by modifying an amino group on a side chain of a polyallylamine with a polyester described in Japanese Unexamined Patent Application Publication No. 9-169821, a graft polymer containing a polyester macromonomer as a copolymerization component described in Japanese Unexamined Patent Application Publication No. 9-171253, and a polyester polyol adduct of a polyurethane described in Japanese Unexamined Patent Application Publication No. 60-166318, for example.

To uniformly disperse light-scattering particles and enhance the effect of reducing leakage light, the polymer dispersant may have a weight-average molecular weight of 750 or more, 1000 or more, 2000 or more, or 3000 or more. To uniformly disperse light-scattering particles, enhance the effect of reducing leakage light, make the ejection of the ink jet ink possible, and make the viscosity of the ink jet ink suitable for stable ejection, the polymer dispersant may have a weight-average molecular weight of 100000 or less, 50000 or less, or 30000 or less. The term "weight-average molecular weight", as used herein, refers to a polystyrene-equivalent weight-average molecular weight measured by gel permeation chromatography (GPC).

In terms of the dispersibility of light-scattering particles, the polymer dispersant content may be 0.5 parts or more by mass, 2 parts or more by mass, or 5 parts or more by mass per 100 parts by mass of light-scattering particles. In terms of the hygrothermal stability of a pixel unit (a cured product of the ink composition), the polymer dispersion content may be 50 parts or less by mass, 30 parts or less by mass, or 10 parts or less by mass per 100 parts by mass of light-scattering particles.

[Photopolymerizable Compound]

A photopolymerizable compound according to the present embodiment is a radical photopolymerizable compound or a cationic photopolymerizable compound, which is polymerized upon light irradiation. These are preferably used in combination with a photopolymerization initiator. The radical photopolymerizable compound is used in combination with a radical photopolymerization initiator, and the cationic photopolymerizable compound is used in combination with a cationic photopolymerization initiator. In other words, the ink composition may contain a photopolymerizable component containing a photopolymerizable compound and a photopolymerization initiator, may contain a radical photopolymerizable component containing a radical photopolymerizable compound and a radical photopolymerization initiator, or may contain a cationic photopolymerizable component containing a cationic photopolymerizable compound and a cationic photopolymerization initiator. The radical photopolymerizable compound may be used in combination with the cationic photopolymerizable compound. A radical photopolymerizable and cationic photopolymerizable compound may be used. The radical photopolymerization initiator may be used in combination with the cationic photopolymerization initiator. The photopolymerizable compounds may be used alone or in combination.

The radical photopolymerizable compound may be a (meth)acrylate compound. The (meth)acrylate compound may be a monofunctional (meth)acrylate with one (meth) acryloyl group or a polyfunctional (meth)acrylate with a plurality of (meth)acryloyl groups. In terms of high fluidity of the ink, and to improve ejection stability, and to reduce the decrease in smoothness due to cure shrinkage during the production of a color filter, the monofunctional (meth) acrylate and the polyfunctional (meth)acrylate are preferably used in combination. The term "(meth)acrylate", as used herein, refers to an "acrylate" and its corresponding "methacrylate". The same is applied to the term "(meth) acryloyl".

Examples of the monofunctional (meth)acrylate include methyl (meth)acrylate, ethyl (meth)acrylate, propyl (meth) acrylate, butyl (meth)acrylate, amyl (meth)acrylate, 2-ethylhexyl (meth)acrylate, octyl (meth)acrylate, nonyl (meth) acrylate, dodecyl (meth)acrylate, hexadecyl (meth)acrylate, octadecyl (meth)acrylate, cyclohexyl (meth)acrylate, methoxyethyl (meth)acrylate, butoxyethyl (meth)acrylate, phenoxyethyl (meth)acrylate, nonylphenoxyethyl (meth) acrylate, glycidyl (meth)acrylate, dimethylaminoethyl (meth)acrylate, diethylaminoethyl (meth)acrylate, isobornyl (meth)acrylate, dicyclopentanyl (meth)acrylate, dicyclopentenyl (meth)acrylate, dicyclopentenyloxyethyl (meth)acrylate, 2-hydroxy-3-phenoxypropyl (meth)acrylate, tetrahydrofurfuryl (meth)acrylate, 2-hydroxyethyl (meth)acrylate, benzyl (meth)acrylate, phenylbenzyl (meth)acrylate, mono (2-acryloyloxyethyl) succinate, N-[2-(acryloyloxy)ethyl] phthalimide, and N-[2-(acryloyloxy)ethyl]tetrahydrophthalimide.

The polyfunctional (meth)acrylate may be a bifunctional (meth)acrylate, a trifunctional (meth)acrylate, a tetrafunctional (meth)acrylate, a pentafunctional (meth)acrylate, or a hexafunctional (meth)acrylate, for example, a di(meth)acrylate in which two hydroxy groups of a diol compound are substituted with a (meth)acryloyloxy group, or a di(meth) acrylate or tri(meth)acrylate in which two or three hydroxy groups of a triol compound are substituted with a (meth) acryloyloxy group.

Specific examples of the bifunctional (meth)acrylate include 1,3-butylene glycol di(meth)acrylate, 1,4-butanediol di(meth)acrylate, 1,5-pentanediol di(meth)acrylate, 3-methyl-1,5-pentanediol di(meth)acrylate, 1,6-hexanediol di(meth)acrylate, neopentyl glycol di(meth)acrylate, 1,8-octanediol di(meth)acrylate, 1,9-nonanediol di(meth)acrylate, tricyclodecane dimethanol di(meth)acrylate, ethylene glycol di(meth)acrylate, poly(ethylene glycol) di(meth)acrylate, propylene glycol di(meth)acrylate, dipropylene glycol di(meth)acrylate, tripropylene glycol di(meth)acrylate, polypropylene glycol di(meth)acrylate, neopentylglycol hydroxypivalate diacrylate, a di(meth)acrylate in which two hydroxy groups of tris(2-hydroxyethyl) isocyanurate are substituted with a (meth)acryloyloxy group, a di(meth) acrylate in which two hydroxy groups of a diol produced by the addition of 4 moles or more of ethylene oxide or propylene oxide to one mole of neopentyl glycol are substituted with a (meth)acryloyloxy group, a di(meth)acrylate in which two hydroxy groups of a diol produced by the addition of two moles of ethylene oxide or propylene oxide to one mole of bisphenol A are substituted with a (meth) acryloyloxy group, a di(meth)acrylate in which two hydroxy groups of a triol produced by the addition of three moles or more of ethylene oxide or propylene oxide to one mole of trimethylolpropane are substituted with a (meth)acryloyloxy group, and a di(meth)acrylate in which two hydroxy groups of a diol produced by the addition of four moles or more of ethylene oxide or propylene oxide to one mole of bisphenol A are substituted with a (meth)acryloyloxy group.

Specific examples of the trifunctional (meth)acrylate include trimethylolpropane tri(meth)acrylate, glycerin triacrylate, pentaerythritol tri(meth)acrylate, and a tri(meth) acrylate in which three hydroxy groups of a triol produced by the addition of three moles or more of ethylene oxide or propylene oxide to one mole of trimethylolpropane are substituted with a (meth)acryloyloxy group.

Specific examples of the tetrafunctional (meth)acrylate include pentaerythritol tetra(meth)acrylate.

Specific examples of the pentafunctional (meth)acrylate include dipentaerythritol penta(meth)acrylate.

Specific examples of the hexafunctional (meth)acrylate include dipentaerythritol hexa(meth)acrylate.

The polyfunctional (meth)acrylate may be a poly(meth) acrylate in which a plurality of hydroxy groups of dipentaerythritol, such as dipentaerythritol hexa(meth)acrylate, are substituted with a (meth)acryloyloxy group.

The (meth)acrylate compound may be an ethylene oxide modified phosphoric acid (meth)acrylate or an ethylene oxide modified alkyl phosphoric acid (meth)acrylate, each having a phosphate group.

The cationic photopolymerizable compound may be an epoxy compound, an oxetane compound, or a vinyl ether compound.

Examples of the epoxy compound include bisphenol A epoxy compounds, bisphenol F epoxy compounds, phenol novolak epoxy compounds, aliphatic epoxy compounds, such as trimethylolpropane polyglycidyl ethers and neopentyl glycol diglycidyl ethers, and alicyclic epoxy compounds, such as 1,2-epoxy-4-vinylcyclohexane and 1-methyl-4-(2-methyloxiranyl)-7-oxabicyclo[4.1.0]heptane.

The epoxy compound may also be a commercial product. Examples of the commercial product of the epoxy compound include "Celloxide 2000", "Celloxide 3000", and "Celloxide 4000" manufactured by Daicel Chemical Industries, Ltd.

The cationic polymerizable oxetane compound may be 2-ethylhexyloxetane, 3-hydroxymethyl-3-methyloxetane, 3-hydroxymethyl-3-ethyloxetane, 3-hydroxymethyl-3-propyloxetane, 3-hydroxymethyl-3-n-butyloxetane, 3-hydroxymethyl-3-phenyloxetane, 3-hydroxymethyl-3-benzyloxetane, 3-hydroxyethyl-3-methyloxetane, 3-hydroxyethyl-3-ethyloxetane, 3-hydroxyethyl-3-propyloxetane, 3-hydroxyethyl-3-phenyloxetane, 3-hydroxypropyl-3-methyloxetane, 3-hydroxypropyl-3-ethyloxetane, 3-hydroxypropyl-3-propyloxetane, 3-hydroxypropyl-3-phenyloxetane, or 3-hydroxybutyl-3-methyloxetane.

The oxetane compound may also be a commercial product. Examples of the commercial product of the oxetane compound include Aron oxetane series ("OXT-101", "OXT-212", "OXT-121", "OXT-221", etc.) manufactured by Toagosei Co., Ltd.; "Celloxide 2021", "Celloxide 2021A", "Celloxide 2021P", "Celloxide 2080", "Celloxide 2081", "Celloxide 2083", "Celloxide 2085", "Epolead GT300", "Epolead GT301", "Epolead GT302", "Epolead GT400", "Epolead GT401", and "Epolead GT403" manufactured by Daicel Chemical Industries, Ltd.; and "Cyracure UVR-6105", "Cyracure UVR-6107", "Cyracure UVR-6110", "Cyracure UVR-6128", "ERL4289", and "ERL4299" manufactured by Dow Chemical Japan Ltd. Known oxetane compounds (for example, oxetane compounds described in Japanese Unexamined Patent Application Publication No. 2009-40830) may also be used.

The vinyl ether compound may be 2-hydroxyethyl vinyl ether, triethylene glycol vinyl monoether, tetraethylene glycol divinyl ether, or trimethylolpropane trivinyl ether.

The photopolymerizable compounds in the present embodiment may be photopolymerizable compounds described in paragraphs 0042 to 0049 of Japanese Unexamined Patent Application Publication No. 2013-182215.

[Log P Value]

A main characteristic of an ink composition according to the present invention is the use of a photopolymerizable compound with a particular Log P value range. For example, a photopolymerizable compound with the particular Log P value range selected from the above exemplified photopolymerizable compounds can be used as an essential component. In the present invention, the use of such a photopolymerizable compound with the particular Log P value range can reduce defects in a cured product thereof. The term "Log P value", as used herein, refers to the logarithmic value of the 1-octanol/water partition coefficient of a photopolymerizable compound and can be calculated by a method described in "Journal of Pharmaceutical Sciences, p. 83, vol. 84, No. 1, 1995" (William M. Meylan, Philip H. Howard). The log P value is typically used for the relative evaluation of the hydrophilicity and hydrophobicity of organic compounds.

For example, the Log P Value is determined as described below.

| | |
|---|---|
| 1,4-butanediol diacetate | 1.39 |
| tetralin | 3.27 |
| LDO | 1.35 |
| OXT-221 | 2.02 |
| ethylene glycol | −1.61 |
| n-lauryl methacrylate | 6.68 |

Although the logarithmic value of the 1-octanol/water partition coefficient may be actually measured according to JIS Z 7260-117, the values determined by the above calculation method correlate highly with many observed results, as described in the above literature.

In an ink composition, particularly an ink jet ink composition, according to the present invention, the photopolymerizable compound has a Log P value in the range of −1.0 to 6.5. If necessary, a photopolymerizable compound with a Log P value outside this range may be contained without losing the technical advantages of the present invention.

To prevent degradation of light-emitting nanocrystals caused by water, the photopolymerizable compound may have a Log P value of 5.0 or less, 4.0 or less, 3.0 or less, or 2.0 or less. To reduce the water absorbency of an ink composition containing light-emitting nanocrystals, the Log P value may be −0.5 or more, 0.0 or more, or 1.0 or more.

To prevent degradation of light-emitting nanocrystals caused by atmospheric oxygen or water, a photopolymerizable compound with a Log P value outside the range of −1.0 to 6.5, if present, may be 30% or less by mass, 20% or less by mass, 10% by mass, 5% or less by mass, or 2% or less by mass of the ink.

To easily achieve a Log P value in the above range, the photopolymerizable compound may have a molecular weight of 1000 or less, 700 or less, 500 or less, 300 or less, or 200 or less.

When a curable component in an ink composition according to the present embodiment is composed entirely or mainly of a photopolymerizable compound, to improve the durability (strength, heat resistance, etc.) of a cured product, the photopolymerizable compound is more preferably as an essential component a bifunctional or higher polyfunctional photopolymerizable compound with two or more polymerizable functional groups per molecule.

To easily form a reliable color filter pixel unit, the photopolymerizable compound may be alkali-insoluble. The phrase "the photopolymerizable compound is alkali-insoluble", as used herein, means that the amount of the photopolymerizable compound dissolved in 1% by mass aqueous potassium hydroxide at 25° C. is 30% or less by mass of the total mass of the photopolymerizable compound. The amount of the photopolymerizable compound dissolved is preferably 10% or less by mass, more preferably 3% or less by mass.

To easily achieve a viscosity appropriate for an ink jet ink, to improve the curability of the ink composition, and to improve the solvent resistance and abrasion resistance of a pixel unit (a cured product of the ink composition), the photopolymerizable compound content may be 10% or more by mass, 15% or more by mass, or 20% or more by mass of the mass of the non-volatile matter of the ink composition. To easily achieve a viscosity appropriate for an ink jet ink and to improve the optical characteristics (leakage light), the photopolymerizable compound content may be 90% or less by mass, 80% or less by mass, 70% or less by mass, 60% or less by mass, or 50% or less by mass of the mass of the non-volatile matter of the ink composition.

In terms of high stability (for example, less degradation over time, good high-temperature storage stability, and high hygrothermal storage stability) of a pixel unit (a cured product of the ink composition), the photopolymerizable compound may have a cross-linking group. The cross-linking group is a functional group that can react with another cross-linking group by the action of heat or an active energy beam (for example, ultraviolet light), for example, an epoxy group, an oxetane group, a vinyl group, an acryloyl group, an acryloyloxy group, or a vinyl ether group.

[Radical Photopolymerization Initiator]

The radical photopolymerization initiator is preferably of a molecule cleavage type or hydrogen abstraction type.

The radical photopolymerization initiator of the molecule cleavage type is preferably benzoin isobutyl ether, 2,4-diethylthioxanthone, 2-isopropylthioxanthone, 2,4,6-trimethylbenzoyldiphenylphosphine oxide, 2-benzyl-2-dimethylamino-1-(4-morpholinophenyl)-butane-1-one, bis(2,6-dimethoxybenzoyl)-2,4,4-trimethylpentylphosphine oxide, (2,4,6-trimethylbenzoyl)ethoxyphenylphosphine oxide, or the like. A radical photopolymerization initiator of the molecule cleavage type other than these may also be used, for example, 1-hydroxycyclohexyl phenyl ketone, benzoin ethyl ether, benzyl dimethyl ketal, 2-hydroxy-2-methyl-1- phenylpropane-1-one, 1-(4-isopropylphenyl)-2-hydroxy-2-methylpropane-1-one, or 2-methyl-1-(4-methylthiophenyl)-2-morpholinopropane-1-one.

The radical photopolymerization initiator of the hydrogen abstraction type may be benzophenone, 4-phenylbenzophenone, isophthalphenone, or 4-benzoyl-4'-methyl-diphenylsulfide. A radical photopolymerization initiator of the molecule cleavage type and a radical photopolymerization initiator of the hydrogen abstraction type may be used in combination.

[Cationic Photopolymerization Initiator]

Examples of the cationic photopolymerization initiator include polyarylsulfonium salts, such as triphenylsulfonium hexafluoroantimonate and triphenylsulfonium hexafluorophosphate; and polyaryliodonium salts, such as diphenyliodonium hexafluoroantimonate and P-nonylphenyliodonium hexafluoroantimonate.

The cationic photopolymerization initiator may be a commercial product. The commercial product may be a sulfonium salt cationic photopolymerization initiator, such as "CPI-100P" manufactured by San-Apro Ltd., an acylphosphine oxide compound, such as "Lucirin TPO" manufactured by BASF, or "Irgacure 907", "Irgacure 819", "Irgacure 379EG", "Irgacure 184", or "Irgacure PAG290" manufactured by BASF.

In terms of the curability of the ink composition, the photopolymerization initiator content may be 0.1 parts or more by mass, 0.5 parts or more by mass, or 1 part or more by mass per 100 parts by mass of the photopolymerizable compound. In terms of the temporal stability of a pixel unit (a cured product of the ink composition), the photopolymerization initiator content may be 40 parts or less by mass, 30 parts or less by mass, or 20 parts or less by mass per 100 parts by mass of the photopolymerizable compound.

To easily achieve a viscosity appropriate for an ink jet ink, to improve the curability of the ink composition, and to improve the solvent resistance and abrasion resistance of a pixel unit (a cured product of the ink composition), the photopolymerizable compound content of the ink composition may be 3% or more by mass, 5% or more by mass, 10% or more by mass, 15% or more by mass, or 20% or more by mass of the mass of the non-volatile matter of the ink composition. To avoid an excessively high viscosity of an ink jet ink and to avoid an excessively large thickness of a pixel unit for the light conversion function, the photopolymerizable compound content may be 80% or less by mass, 60% or less by mass, or 50% or less by mass of the mass of the non-volatile matter of the ink composition.

An ink composition according to the present invention is a photocurable ink composition containing a photopolymerizable compound. Thus, for example, this can prevent degradation of light-emitting nanocrystal particles caused by heat curing at high temperatures.

An ink composition according to the present embodiment can be used as an ink for use in a method for producing a traditional color filter. To avoid waste of materials, such as relatively expensive light-emitting nanocrystal particles and a solvent, and to use only a required amount of the ink composition in a required portion to form a color filter pixel unit (light conversion layer), the ink composition is appropriately prepared to be suitable for an ink jet method rather than for photolithography.

In terms of ejection stability in ink jet printing, for example, the ink composition may have a viscosity of 2 mPa·s or more, 5 mPa·s or more, or 7 mPa·s or more. The ink composition may have a viscosity of 20 mPa·s or less, 15 mPa·s or less, or 12 mPa·s or less. The ink composition with a viscosity of 2 mPa·s or more has a stable meniscus shape at the tip of an ink ejection hole of an ejection head, which makes it easy to control the ejection (for example, ejection rate and ejection timing) of the ink composition. The ink composition with a viscosity of 20 mPa·s or less can be smoothly ejected from an ink ejection hole. The ink composition may have a viscosity in the range of 2 to 20 mPa·s, 2 to 15 mPa·s, 2 to 12 mPa·s, 5 to 20 mPa·s, 5 to 15 mPa·2 to 20 mPa·s, 7 to 15 mPa·s, 7 to 12 mPa·s, s, or 7 to 12 mPa·s. The viscosity of the ink composition is measured with an E-type viscometer, for example.

The surface tension of the ink composition is preferably suitable for an ink jet method and more specifically preferably ranges from 20 to 40 mN/m, more preferably 25 to 35 mN/m. A surface tension in these ranges can result in a lower occurrence of flight deviation. The term "flight deviation", as used herein, means that the landing position of an ink composition ejected from an ink ejection hole deviates by 30 μm or more from the target position. The ink composition with a surface tension of 40 mN/m or less has a stable meniscus shape at the tip of an ink ejection hole, which makes it easy to control the ejection (for example, ejection rate and ejection timing) of the ink composition. A surface tension of 20 mN/m or less can result in a lower occurrence of flight deviation. More specifically, there is no pixel unit filled with an insufficient amount of ink composition due to landing outside a pixel-unit-forming region into which the ink composition is to be landed, or there is no reduction in color reproducibility due to landing of the ink composition into a pixel-unit-forming region (or pixel unit) adjacent to a pixel-unit-forming region into which the ink composition is to be landed.

The ink composition may further contain another component other than light-emitting nanocrystal particles, light-scattering particles, a photopolymerizable compound, a thermosetting resin, a polymer dispersant, a polymerization initiator, or an organic ligand without losing the advantages of the present invention. Examples of the other component include a sensitizer and a solvent.

[Sensitizer]

The sensitizer may be an amine that does not undergo an addition reaction with a photopolymerizable compound. Examples of the sensitizer include trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone.

[Organic Solvent]

Examples of the organic solvent include ethylene glycol monobutyl ether acetate, diethylene glycol monobutyl ether acetate, diethylene glycol monoethyl ether acetate, diethylene glycol dibutyl ether, diethyl adipate, dibutyl oxalate, dimethyl malonate, diethyl malonate, dimethyl succinate, diethyl succinate, 1,4-butanediol diacetate, and glyceryl triacetate.

In the preparation of an ink composition according to the present invention, in addition to a photopolymerizable compound, an organic solvent may further be used. In terms of the continuous ejection stability of an ink jet ink, the organic solvent preferably has a boiling point of 180° C. or more. In the formation of a pixel unit, the organic solvent must be removed from the ink composition before the ink composition is cured. To easily remove the solvent, the solvent preferably has a boiling point of 300° C. or less.

In the preparation of an ink composition according to the present invention, a liquid photopolymerizable compound may be used to prepare a solvent-free ink composition without the organic solvent (not corresponding to a photopolymerizable compound). The solvent-free ink composition has a small volume change when dried if containing an organic solvent and is advantageous for the formation of a thick ink film, for example. More specifically, as compared with an ink composition containing an organic solvent, to form a film with a certain thickness, an organic-solvent-free ink composition can advantageously decrease the amount of ink composition to be applied or decrease the application frequency of the ink composition. If possible, the use of an ink composition without such an organic solvent is preferred in order to obviate the need for a process of removing the organic solvent before a cured product is formed, to reduce the occurrence of defects in a thin ink film before curing, for example, possibly caused by removal of the organic solvent, to eliminate concerns of organic solvent emission in the atmosphere possibly responsible for environmental degradation, and to obviate the need for facilities for collecting and reusing the organic solvent. The photopolymerizable compound is more preferably liquid at normal temperature or is preferably liquid at 60° C. or less because the photopolymerizable compound can be liquefied simply by heating.

[Water Content]

The water content of an ink composition according to the present invention can be measured with a Karl Fischer moisture meter (for example, model number CA-06, manufactured by Mitsubishi Chemical Corporation, with a vaporization unit VA-06 manufactured by Mitsubishi Chemical Corporation). To prevent degradation of light-emitting nanocrystals, the water content of the ink composition may be 90 ppm or less, 50 ppm or less, 20 ppm or less, 9 ppm or less, 4 ppm or less, 2 ppm or less, or 1 ppm or less.

In an ink composition according to the present invention, which contains a photopolymerizable compound with a Log P value in a particular range, the above water content range is more preferred in order to reduce the occurrence of defects in a cured product or to more effectively prevent degradation of light-emitting nanocrystals. For an ink jet ink composition, along with the ejection method, this is expected to have the greatest technical advantages.

In the present invention, the water content of an ink composition or ink composition material, such as a photopolymerizable compound, can be controlled in the above particular content range by the following method. For example, a photopolymerizable compound dehydrated with a molecular sieve is used to prepare an ink composition, or a molecular sieve is added to a photopolymerizable compound, or a molecular sieve is added to an ink composition and is filtered after dehydration with the molecular sieve. If necessary, the filtration may be omitted.

Although the dehydration time is not particularly limited, it takes time for a molecular sieve to adsorb water molecules in an ink composition or ink composition material, such as a photopolymerizable compound. Thus, dehydration may be performed for 12 hours or more, 24 hours or more, or 48 hours or more after the addition of a molecular sieve. The dehydration may be performed in the atmosphere and is preferably performed in an inert gas atmosphere substantially free of water. A molecular sieve to be used is preferably subjected to heat treatment to remove adsorbed water before use. The heating temperature may be 200° C. or more, 250° C. or more, 300° C. or more, or 350° C. or more. During the heating, reducing pressure, for example, to 0.1 mmHg or less, 0.01 mmHg, or 0.001 mmHg or less, is also preferred in order to remove adsorbed water molecules.

Solid raw materials, such as light-scattering particles, which can adsorb water molecules in the atmosphere, may be dehydrated before use and may be superheated in the atmosphere, in an inert gas atmosphere, or under reduced pressure to remove water.

Water dissolves in a liquid in the atmosphere. Thus, the ink composition materials may be dehydrated before the preparation of an ink composition. Alternatively, an ink composition may be prepared without dehydrating the ink composition materials, and then the ink composition may be dehydrated. The ink composition materials may be dehydrated before an ink composition is prepared, and then the ink composition may also be dehydrated. A stricter dehydration operation can reduce the occurrence of defects in a cured product and more reliably prevent degradation of light-emitting nanocrystals.

[Dissolved Oxygen Concentration]

In one embodiment, the dissolved oxygen concentration of an ink composition or ink composition material, such as a photopolymerizable compound, can be decreased by exposing an ink or the photopolymerizable compound to an inert gas flow, such as nitrogen or argon, or by blowing an inert gas into it. Solid raw materials, such as light-scattering particles, can be stored in a nitrogen atmosphere in a container filled with a nitrogen stream, which can prevent oxygen contamination in an ink composition.

The dissolved oxygen concentration can be determined by measuring dissolved oxygen in an ink composition with an optical solvent-resistant dissolved oxygen sensor. More specifically, for example, the dissolved oxygen concentration of an ink composition can be measured with Visiferm manufactured by Hamilton Company. The dissolved oxygen concentration can be decreased below the lower measurement limit of a dissolved oxygen sensor, and such a case is also an embodiment of the present invention.

Dissolved gases including dissolved oxygen and other gases can be removed from an ink composition by a traditional method. More specifically, the pressure of an ink composition may be reduced to remove dissolved gases including dissolved oxygen, or a deoxidizer may be added to an ink composition.

[Deoxidizer]

An ink composition according to an embodiment contains a deoxidizer, which can react with dissolved oxygen and decrease the oxygen concentration, for example, L-ascorbic acid, erythorbic acid, gallic acid, or a salt thereof, pyrogallol, or gallacetophenone.

In the present invention, to prevent degradation of light-emitting nanocrystals, the deoxidizer content of an ink composition may be 0.01% or more by mass, 0.1% or more by mass, 0.5% or more by mass, or 1% or more by mass, and to prevent coloring of a cured ink film, the deoxidizer content may be 30% or less by mass, 20% or less by mass, 10% or less by mass, or 5% or less by mass.

Preferably, dissolved gases are conveniently removed from an ink composition by introducing an inert gas, such as nitrogen gas, into the ink composition to remove the dissolved gases including dissolved oxygen or by reducing the pressure of the ink composition.

More preferably, to more effectively prevent defects in a cured product and degradation of light-emitting nanocrystals, the method of removing dissolved gases including dissolved oxygen from an ink composition and the method of dehydrating an ink composition can be performed in combination to prepare an ink composition with both a low dissolved gas concentration and a low water concentration.

An embodiment of an ink composition for a color filter is described above. The ink composition according to the embodiment can be used, for example, in photolithography as well as in the ink jet method. In this case, the ink composition contains an alkali-soluble resin as a binder polymer.

When an ink composition is used in photography, the ink composition is first applied to a substrate. When the ink composition contains a solvent, the ink composition is dried to form a coating film. The coating film thus formed is soluble in an alkaline developer and is patterned with the alkaline developer. To facilitate disposal of waste developers, alkaline developers are mostly aqueous solutions. Thus, the coating film of the ink composition is treated with an aqueous solution. For an ink composition containing light-emitting nanocrystal particles (quantum dots, etc.), the light-emitting nanocrystal particles are unstable in water, and light-emitting properties (for example, fluorescence) are impaired by water. Thus, in the present embodiment, an ink jet method, which does not require treatment with an alkaline developer (aqueous solution), is preferred.

Even if a coating film of an ink composition is not treated with an alkaline developer, when the ink composition is alkali-soluble, the coating film of the ink composition easily absorbs atmospheric water, and the light-emitting properties (for example, fluorescence) of light-emitting nanocrystal particles (quantum dots, etc.) are impaired over time. From this perspective, in the present embodiment, the coating film of the ink composition is preferably alkali-insoluble. Thus, an ink composition according to the present embodiment can preferably form an alkali-insoluble coating film. Such an ink composition can be produced by using an alkali-insoluble photopolymerizable compound as a photopolymerizable compound. The phrase "the coating film of the ink composition is alkali-insoluble", as used herein, means that the amount of the coating film of the ink composition dissolved in 1% by mass aqueous potassium hydroxide at 25° C. is 30% or less by mass of the total mass of the coating film of the ink composition. The amount of the coating film of the ink composition dissolved is preferably 10% or less by mass, more preferably 3% or less by mass. The fact that an ink composition can form an alkali-insoluble coating film can be confirmed by applying the ink composition to a substrate, drying the ink composition at 80° C. for 3 minutes when the ink composition contains a solvent, and measuring the amount of the resulting coating film 1 μm in thickness dissolved as described above.

<Method for Producing Ink Composition>

A method for producing an ink composition according to the above embodiment is described below. For example, the method for producing an ink composition includes a first step of preparing a light-scattering particle dispersion containing light-scattering particles and a polymer dispersant and a second step of mixing the light-scattering particle dispersion and light-emitting nanocrystal particles. In this method, the light-scattering particle dispersion may further contain as an essential component a photopolymerizable compound with a Log P value in a particular range as described above, and the photopolymerizable compound may be mixed in the second step. The light-scattering particles can be sufficiently dispersed by this method. Thus, an ink composition that can reduce leakage light in a pixel unit can be easily produced.

In the step of preparing the light-scattering particle dispersion, the light-scattering particles, the polymer dispersant, and the optional photopolymerizable compound may be mixed and dispersed to prepare the light-scattering particle dispersion. The mixing and dispersion may be performed with a dispersing apparatus, such as a bead mill, a paint conditioner, or a planetary mixer. To improve the dispersibility of light-scattering particles and to easily adjust the average particle size of light-scattering particles in a desired range, a bead mill or a paint conditioner is preferably used.

The method for producing an ink composition may further include a step of preparing a light-emitting nanocrystal particle dispersion containing the light-emitting nanocrystal particles and the photopolymerizable compound before the second step. In this case, in the second step, the light-scattering particle dispersion and the light-emitting nanocrystal particle dispersion are mixed. The light-emitting nanocrystal particles can be sufficiently dispersed by this method. Thus, an ink composition that can reduce leakage light in a pixel unit can be easily produced.

In the step of preparing the light-emitting nanocrystal particle dispersion, the light-emitting nanocrystal particles and the photopolymerizable compound may be mixed and dispersed in the dispersing apparatus for use in the step of preparing the light-scattering particle dispersion.

The ink composition thus produced is prepared as described above to have a particular water content.

When an ink composition according to the present embodiment is used as an ink composition for use in an ink jet method, the ink composition is preferably used in a piezoelectric ink jet recording apparatus with a mechanical ejection mechanism including a piezoelectric device. In the piezoelectric ink jet method, the ink composition is not instantaneously exposed to high temperature during ejection, the light-emitting nanocrystal particles are less likely to be deteriorated, and a color filter pixel unit (light conversion layer) can more easily have expected light-emitting properties.

<Light Conversion Layer and Color Filter>

A light conversion layer and a color filter produced by using the ink composition according to the above embodiment are described in detail below with reference to the accompanying drawing. In the following description, the same or corresponding elements are denoted by the same reference numerals and letters and are not repeatedly described.

FIG. 1 is a schematic cross-sectional view of a color filter according to an embodiment. As illustrated in FIG. 1, a color filter 100 includes a substrate 40 and a light conversion layer 30 located on the substrate 40. The light conversion layer 30 includes a plurality of pixel units 10 and a light-shielding portion 20.

The light conversion layer 30 includes, as the pixel units 10, a first pixel unit 10a, a second pixel unit 10b, and a third pixel unit 10c. The first pixel unit 10a, the second pixel unit 10b, and the third pixel unit 10c are repetitively arranged in a grid-like pattern in this order. The light-shielding portion 20 is located between adjacent pixel units, that is, between the first pixel unit 10a and the second pixel unit 10b, between the second pixel unit 10b and the third pixel unit 10c, and between the third pixel unit 10c and the first pixel unit 10a. In other words, these adjacent pixel units are separated by the light-shielding portion 20.

Each of the first pixel unit 10a and the second pixel unit 10b contains the cured product of the ink composition according to the above embodiment. The cured product contains the light-emitting nanocrystal particles, the light-scattering particles, and a cured component. The cured component is a cured product of the photopolymerizable compound and is more specifically a cured product produced by polymerization of the photopolymerizable compound. Thus, the first pixel unit 10a includes a first cured component 13a as well as first light-emitting nanocrystal particles 11a and first light-scattering particles 12a each dispersed in the first cured component 13a. Likewise, the second pixel unit 10b includes a second cured component 13b as well as second light-emitting nanocrystal particles 11b and second light-scattering particles 12b each dispersed in the second cured component 13b. In the first pixel unit 10a and the second pixel unit 10b, the first cured component 13a may be the same as or different from the second cured component 13b, and the first light-scattering particles 12a may be the same as or different from the second light-scattering particles 12b.

The first light-emitting nanocrystal particles 11a are red-light-emitting nanocrystal particles that absorb light with a wavelength in the range of 420 to 480 nm and emit light with an emission peak wavelength in the range of 605 to 665 nm. Thus, the first pixel unit 10a may also be referred to as a red pixel unit that converts blue light to red light. The second light-emitting nanocrystal particles 11b are green-light-emitting nanocrystal particles that absorb light with a wavelength in the range of 420 to 480 nm and emit light with an emission peak wavelength in the range of 500 to 560 nm. Thus, the second pixel unit 10b may also be referred to as a green pixel unit that converts blue light to green light.

To enhance the effect of reducing leakage light, the light-emitting nanocrystal particle content of the pixel unit containing the cured product of the ink composition may be 5% or more by mass, 10% or more by mass, 15% or more by mass, 20% or more by mass, 30% or more by mass, or 40% or more by mass of the total mass of the cured product of the ink composition. In terms of high reliability of the pixel unit, the light-emitting nanocrystal particle content may be 70% or less by mass, 60% or less by mass, 55% or less by mass, or 50% or less by mass of the total mass of the cured product of the ink composition.

To enhance the effect of reducing leakage light, the light-scattering particle content of the pixel unit containing the cured product of the ink composition may be 0.1% or more by mass, 1% or more by mass, 5% or more by mass, 7% or more by mass, 10% or more by mass, or 12% or more by mass of the total mass of the cured product of the ink composition. To enhance the effect of reducing leakage light and in terms of high reliability of the pixel unit, the light-scattering particle content may be 60% or less by mass, 50% or less by mass, 40% or less by mass, 30% or less by mass, 25% or less by mass, 20% or less by mass, or 15% or less by mass of the total mass of the cured product of the ink composition. The light-scattering particle content may range from 0.1% to 60% by mass, 0.1% to 50% by mass, 0.1% to 40% by mass, 0.1% to 30% by mass, 0.1% to 25% by mass, 0.1% to 20% by mass, 0.1% to 15% by mass, 1% to 60% by mass, 1% to 50% by mass, 1% to 40% by mass, 1% to 30% by mass, 1% to 25% by mass, 1% to 20% by mass, 1% to 15% by mass, 5% to 60% by mass, 5% to 50% by mass, 5% to 40% by mass, 5% to 30% by mass, 5% to 25% by mass, 5% to 20% by mass, 5% to 15% by mass, 7% to 60% by mass, 7% to 50% by mass, 7% to 40% by mass, 7% to 30% by mass, 7% to 25% by mass, 7% to 20% by mass, 7% to 15% by mass, 10% to 60% by mass, 10% to 50% by mass, 10% to 40% by mass, 10% to 30% by mass, 10% to 25% by mass, 10% to 20% by mass, 10% to 15% by mass, 12% to 60% by mass, 12% to 50% by mass, 12% to 40% by mass, 12% to 30% by mass, 12% to 25% by mass, 12% to 20% by mass, or 12% to 15% by mass of the total mass of the cured product of the ink composition.

The third pixel unit 10c has a light transmittance of 30% or more at a wavelength in the range of 420 to 480 nm. Thus, the third pixel unit 10c functions as a blue pixel unit when a light source is used to emit light with a wavelength in the range of 420 to 480 nm. For example, the third pixel unit 10c contains the cured product of the composition containing the photopolymerizable compound. The cured product contains a third cured component 13c. The third cured component 13c is a cured product of the photopolymerizable compound and is more specifically a cured product produced by polymerization of the photopolymerizable compound. Thus, the third pixel unit 10c contains the third cured component 13c. When the third pixel unit 10c contains the cured product, the composition containing the photopolymerizable compound may further contain a component contained in the ink composition other than the photopolymerizable compound, provided that the third pixel unit 10c has a light transmittance of 30% or more at a wavelength in the range of 420 to 480 nm. The transmittance in the third pixel unit 10c can be measured with a microspectrometer.

The pixel units (the first pixel unit 10a, the second pixel unit 10b, and the third pixel unit 10c) may have a thickness of 1 μm or more, 2 μm or more, or 3 μm or more, for example. The pixel units (the first pixel unit 10a, the second pixel unit 10b, and the third pixel unit 10c) may have a thickness of 30 μm or less, 20 μm or less, or 15 μm or less, for example.

The light-shielding portion 20 is a black matrix that is formed to separate adjacent pixel units and prevent color mixing and to prevent light leakage from a light source. The material of the light-shielding portion 20 may be, but is not limited to, a metal, such as chromium, or a cured product of a resin composition containing light-shielding particles, such as carbon fine particles, metal oxide, an inorganic pigment, or an organic pigment, in a binder polymer. The binder polymer may be a mixture of one or two or more resins, such as polyimide resins, acrylic resins, epoxy resins, polyacrylamides, poly(vinyl alcohol), gelatin, casein, and cellulose, a photosensitive resin, or an O/W emulsion-type resin composition (for example, emulsified reactive silicone). For example, the light-shielding portion 20 may have a thickness of 0.5 μm or more and may have a thickness of 10 μm or less.

The substrate 40 is a light-transmitting transparent substrate, for example, a transparent glass substrate, such as a quartz glass sheet, a Pyrex (registered trademark) glass sheet, or a synthetic quartz sheet, or a transparent flexible substrate, such as a transparent resin film or an optical resin film. Among these, preferred is a glass substrate formed of non-alkali glass containing no alkaline component in glass. More specifically, preferred are "7059 glass", "1737 glass", "Eagle 200", and "Eagle XG" manufactured by Corning Inc., "AN100" manufactured by Asahi Glass Co., Ltd., and "OA-10G" and "OA-11" manufactured by Nippon Electric Glass Co., Ltd. These are materials with a low thermal expansion coefficient and have high dimensional stability and high workability in high-temperature heat treatment.

The color filter 100 including the light conversion layer 30 is suitably used when a light source is used to emit light with a wavelength in the range of 420 to 480 nm.

For example, the color filter 100 can be produced by forming a pattern of the light-shielding portion 20 on the substrate 40, selectively applying the ink composition (ink jet ink) according to the embodiment by an ink jet method to a pixel-unit-forming region divided by the light-shielding portion 20 on the substrate 40, and curing the ink composition by active energy beam irradiation or heating.

A method for forming the light-shielding portion 20 may be a method for forming a thin metal film, such as chromium, or a thin film of a resin composition containing light-shielding particles in a boundary region between a plurality of pixel units on a surface of the substrate 40, and patterning the thin film. For example, the thin metal film can be formed by sputtering or vacuum evaporation, and the thin film of a resin composition containing light-shielding particles can be formed by coating or printing. The patterning may be performed by photolithography.

The ink jet method may be a Bubble Jet (registered trademark) method using an electrothermal transducer as an energy-generating device or a piezoelectric ink jet method using a piezoelectric device.

When the ink composition is cured by active energy beam (for example, ultraviolet light) irradiation, for example, a mercury lamp, a metal halide lamp, a xenon lamp, or LED may be used. For example, the irradiation light may have a wavelength of 200 nm or more and may have a wavelength of 440 nm or less. For example, the light exposure may be 10 mJ/cm$^2$ or more and may be 4000 mJ/cm$^2$ or less.

For curing of the ink composition by heating, for example, the heating temperature may be 110° C. or more and may be 250° C. or less. For example, the heating time may be 10 minutes or more and may be 120 minutes or less.

Although the embodiments of color filters and light conversion layers and methods for producing these are described above, the present invention are not limited to these embodiments.

For example, the light conversion layer may include a pixel unit (blue pixel unit) containing a cured product of an ink composition containing blue-light-emitting nanocrystal particles instead of the third pixel unit 10c or in addition to the third pixel unit 10c. The light conversion layer may include a pixel unit (for example, a yellow pixel unit) containing a cured product of an ink composition containing nanocrystal particles that emit color light other than red, green, or blue. In these cases, the light-emitting nanocrystal particles in each pixel unit of the light conversion layer preferably have an absorption maximum wavelength in the same wavelength region.

At least part of the pixel units in the light conversion layer may contain a cured product of a composition containing a pigment other than the light-emitting nanocrystal particles.

A color filter may include an ink-repellent layer formed of an ink-repellent material, which is narrower than the light-shielding portion, on the pattern of the light-shielding portion. Instead of the ink-repellent layer, a photocatalyst-containing layer serving as a wettability variable layer may be formed in the solid pattern to a region including the pixel-unit-forming region, and then the photocatalyst-containing layer may be irradiated with light through a photomask to selectively increase the affinity of the pixel-unit-forming region to ink. The photocatalyst may be titanium oxide.

A color filter may include an ink-receiving layer containing hydroxypropylcellulose between a substrate and a pixel unit.

A color filter may include a protective layer on a pixel unit. The protective layer is formed to flatten the color filter and to prevent the elution of components contained in the pixel unit or components contained in the pixel unit and components contained in a photocatalyst-containing layer to a liquid crystal layer. Materials of the protective layer may be those used in protective layers for known color filters.

In the production of a color filter and a light conversion layer, a pixel unit may be formed by photolithography instead of an ink jet method. In this case, first, an ink composition is applied in a layer to a substrate to form an ink composition layer. The ink composition layer is then exposed to patterned light and is then developed with a developer. In this manner, a pixel unit formed of a cured product of the ink composition is formed. The developer is typically alkaline, and therefore an alkali-soluble polymer is used as a binder polymer. In terms of the efficiency in the use of materials, the ink jet method is superior to photolithography. This is because almost two-thirds or more of the materials are theoretically removed as wastes in photolithography. Thus, in the present embodiment, a pixel unit is preferably formed by an ink jet method using an ink jet ink.

In addition to the above light-emitting nanocrystal particles, the pixel unit in the light conversion layer in the present embodiment may further contain a pigment of almost the same color as the emission color of the light-emitting nanocrystal particles. For example, when a pixel unit containing light-emitting nanocrystal particles that absorb blue light for light emission is used as a pixel unit of a liquid crystal display device, blue light or quasi-white light with a peak at 450 nm is used as light from a light source. When the concentration of the light-emitting nanocrystal particles in the pixel unit is insufficient, light from the light source passes through the light conversion layer while the liquid crystal display device is driven. The transmitted light (blue light, leakage light) from the light source mixes with light from the light-emitting nanocrystal particles. To prevent a reduction in color reproducibility due to such color mixing, the pixel unit in the light conversion layer may contain a pigment. To introduce a pigment into the pixel unit, the ink composition may contain the pigment.

One or two of the red pixel unit (R), the green pixel unit (G), and the blue pixel unit (B) in the light conversion layer of the present embodiment may be used as a pixel unit or pixel units that do not contain light-emitting nanocrystal particles but contain a coloring material. The coloring material to be used may be a known coloring material, for example, a diketopyrrolopyrrole pigment and/or an anionic red organic dye for use in the red pixel unit (R). A coloring material for use in the green pixel unit (G) may be at least one selected from the group consisting of halogenated copper phthalocyanine pigments, phthalocyanine green dyes, and mixtures of phthalocyanine blue dyes and azo yellow organic dyes. A coloring material for use in the blue pixel unit (B) may be an c copper phthalocyanine pigment and/or a cationic blue organic dye. To prevent a decrease in transmittance, the amount of each coloring material to be used in a light conversion layer preferably ranges from 1% to 5% by mass of the total mass of the pixel unit (a cured product of the ink composition).

EXAMPLES

The present invention is further described in the following examples. However, the present invention is not limited to these examples.

The following production operations of light-emitting nanocrystals and ink are performed in a glove box filled with nitrogen or in a nitrogen stream in a flask without air.

For all the following exemplified raw materials, air in their containers was purged and replaced with nitrogen gas before use. For liquid materials, nitrogen gas was introduced into the liquid to replace dissolved oxygen with the nitrogen gas.

Chloroform, ethanol, hexane, toluene, an epoxy monomer, and an oxetane monomer to be used were dehydrated and dried in advance with a molecular sieve (basically with 3A; for hexane and toluene, with 4A) for 48 hours or more.

Titanium oxide before use was heated under a reduced pressure of 1 mmHg for 2 hours at 120° C. and was left to cool in an nitrogen gas atmosphere.

[Production of Red-Light-Emitting Nanocrystals]

A 1000-ml flask was charged with 17.48 g of indium acetate, 25.0 g of trioctylphosphine oxide, and 35.98 g of lauric acid, which were then stirred at 160° C. for 40 minutes with nitrogen gas bubbling. The mixture was further stirred at 250° C. for 20 minutes and was then heated to 300° C. with stirring. 4.0 g of tris(trimethylsilyl)phosphine was dissolved in 15.0 g of trioctylphosphine in a glove box and was charged into a glass syringe. This was injected into a flask at 300° C. and was allowed to react at 250° C. for 10 minutes. 5 ml of a liquid mixture containing 7.5 g of tris(trimethylsilyl)phosphine dissolved in 30.0 g of trioctylphosphine was added dropwise to the reaction solution for 12 minutes in a glove box. Subsequently, another 5 ml of the liquid mixture was added to the reaction solution at intervals of 15 minutes until the liquid mixture was completely consumed.

Another three-neck flask was charged with 5.595 g of indium acetate, 10.0 g of trioctylphosphine oxide, and 11.515 g of lauric acid, which were stirred at 160° C. for 40 minutes with nitrogen gas bubbling. After stirring at 250° C. for 20 minutes and heating to 300° C., the mixed solution cooled to 70° C. was added to the reaction solution. 5 ml of a liquid mixture containing 4.0 g of tris(trimethylsilyl) phosphine dissolved in 15.0 g of trioctylphosphine was again added dropwise to the reaction solution for 12 minutes in a glove box. Subsequently, another 5 ml of the liquid mixture was added to the reaction solution at intervals of 15 minutes until the liquid mixture was completely consumed. After stirring for 1 hour and cooling to room temperature, 100 ml of toluene and 400 ml of ethanol were added to agglomerate fine particles. After the fine particles were precipitated with a centrifugal separator, the supernatant liquid was discarded, and the precipitated fine particles were dissolved in trioctylphosphine to produce a trioctylphosphine solution of indium phosphide (InP) red-light-emitting nanocrystals.

[Production of Green-Light-Emitting Nanocrystals]

A 1000-ml flask was charged with 23.3 g of indium acetate, 40.0 g of trioctylphosphine oxide, and 48.0 g of lauric acid, which were then stirred at 160° C. for 40 minutes with nitrogen gas bubbling. The mixture was further stirred at 250° C. for 20 minutes and was then heated to 300° C. with stirring. 10.0 g of tris(trimethylsilyl)phosphine was dissolved in 30.0 g of trioctylphosphine in a glove box and was charged into a glass syringe. This was injected into a flask at 300° C. and was allowed to react at 250° C. for 5 minutes. The flask was cooled to room temperature, and 100 ml of toluene and 400 ml of ethanol were added to agglomerate fine particles. After the fine particles were precipitated with a centrifugal separator, the supernatant liquid was discarded, and the precipitated fine particles were dissolved in trioctylphosphine to produce a trioctylphosphine solution of indium phosphide (InP) green-light-emitting nanocrystals.

[Production of InP/ZnS Core-Shell Nanocrystals]

The trioctylphosphine solution of synthesized InP nanocrystals was adjusted to 3.6 g of InP and 90 g of trioctylphosphine and was poured into a 1000-ml flask, to which 90 g of trioctylphosphine oxide and 30 g of lauric acid were further added. 42.9 ml of 1 M hexane solution of diethyl zinc and 92.49 g of a trioctylphosphine solution of 9.09% by weight bistrimethylsilyl sulfide were mixed with 162 g of trioctylphosphine in a glove box to produce a stock solution. After the flask was purged with nitrogen, the temperature of the flask was set at 180° C. When the temperature reached 80° C., 15 ml of the stock solution was added, and another 15 ml was subsequently added at intervals of 10 minutes. (The flask temperature was maintained at 180° C.). After the final addition, the temperature was maintained for another 10 minutes to complete the reaction. After the completion of the reaction, the solution was cooled to normal temperature, and 500 ml of toluene and 2000 ml of ethanol were added to form aggregated nanocrystals. After the nanocrystals were precipitated with a centrifugal separator, the supernatant liquid was discarded, and the precipitate was again dissolved in chloroform such that the concentration of nanocrystals in the solution was 20% by mass, thus producing a chloroform solution of InP/ZnS core-shell nanocrystals.

[QD Ligand Exchange]

With reference to Japanese Unexamined Patent Application Publication No. 2002-121549, a triethylene glycol monomethyl ether ester of 3-mercaptopropanoic acid (triethylene glycol monomethyl ether mercaptopropionate) (TEGMEMP) was synthesized.

In a container filled with nitrogen gas, a QD dispersion liquid 1 (the InP/ZnS core-shell nanocrystals (red-light-emitting)) and 80 g of a solution of 8 g of the synthesized TEGMEMP dissolved in chloroform were mixed at 80° C. for 2 hours with stirring to perform ligand exchange and were cooled to room temperature.

Subsequently, toluene/chloroform were evaporated under reduced pressure at 40° C. with stirring to concentrate the mixture to a liquid volume of 100 ml. Four-fold weight of n-hexane was added to the dispersion liquid to form aggregated QDs, and the supernatant liquid was removed by centrifugation and decantation. 50 g of toluene was added to the precipitate, and the precipitate was redispersed by ultrasonic waves. The washing operation was performed three times to remove the remaining ligand component released in the liquid. The precipitate after decantation was dried under vacuum at room temperature for 2 hours to produce 2 g of a TEGMEMP-modified QD (QD-TEGMEMP) powder.

[Preparation of QD/Alicyclic Epoxy Monomer Dispersion 1]

In a container filled with nitrogen gas, 2 g of the QD-TEGMEMP and 8 g of an alicyclic epoxy monomer were mixed and dispersed by ultrasonic waves to produce a QD/alicyclic epoxy monomer dispersion 1 (QD content: 20% by mass).

[Preparation of Titanium Oxide Dispersion Liquid]

In a container filled with nitrogen gas, 12.9 g of titanium oxide, 1.3 g of a polymer dispersant, and 18.1 g of an oxetane monomer were mixed. After zirconia beads (diameter: 1.25 mm) were added to the mixture in the container filled with nitrogen gas, the airtight container filled with nitrogen gas was shaken in a paint conditioner for 2 hours to disperse the mixture. Nitrogen gas was then introduced into the container to replace dissolved oxygen with the nitrogen gas. Thus, a light-scattering particle dispersion 1 was produced.

Example 1

[Preparation of Ink Composition]

In a container filled with nitrogen gas, 6.47 g of the QD/alicyclic epoxy monomer dispersion 1, 3.23 g of the light-scattering particle dispersion 1, and 0.3 g of a cationic photopolymerization initiator were mixed, and the mixture was then passed through a filter with a pore size of 5 μm in a glove box. Nitrogen gas was introduced into an ink, and the ink was saturated with the nitrogen gas.

The nitrogen gas was then removed under reduced pressure. Thus, an ink composition was produced. The following materials were used.

[Light-Scattering Particles]

titanium oxide: JR-806 (trade name, manufactured by Tayca Corporation, average particle size (volume-average size): 300 nm)

[Photopolymerizable Compound]

alicyclic epoxy monomer: LDO (trade name, Tomoe Engineering Co., Ltd.)

oxetane monomer: Aron oxetane OXT-221 (trade name, manufactured by Toagosei Co., Ltd., "Aron oxetane" is a registered trademark)

[Polymer Dispersant]

polymer dispersant: DISPERBYK-2155 (trade name, manufactured by BYK, "DISPERBYK" is a registered trademark)

[Polymerization Initiator]

cationic photopolymerization initiator: CPI-100P (trade name, manufactured by San-Apro Ltd., "CPI" is a registered trademark)

The liquid materials were dehydrated with a molecular sieve 3A for 48 hours or more before mixing. Titanium oxide before mixing was heated under a reduced pressure of 1 mmHg for 2 hours at 120° C. and was left to cool in an nitrogen gas atmosphere.

Example 2

[Preparation of Ink Composition]

In a container filled with nitrogen gas, an ink composition was produced in the same manner as in Example 1 except that a QD/alicyclic epoxy monomer dispersion 2 (green-light-emitting) was used.

Comparative Example 1

An ink composition was produced in the same manner as in Example 1 except that an epoxy monomer listed in the table below not dehydrated with a molecular sieve was used in an ink composition adjustment method.

(2) Production of Light Conversion Filter

The ink composition was applied to a glass substrate with a spin coater such that the film thickness after drying was 4 μm. The resulting film was dried and irradiated with ultraviolet light at a light exposure of 2000 mJ/cm². Thus, the ink composition was cured, and a layer formed of the cured product of the ink composition (light conversion layer) was formed on the glass substrate. A light conversion filter was produced by the above operations.

(3) Evaluation

The ink composition and the light conversion filter were evaluated through the following procedures. Table 1 shows the results.

[External Quantum Efficiency (EQE)]

The blue LED (peak emission wavelength: 450 nm) was used. The spectroradiometer (trade name "MCPD-9800") manufactured by Otsuka Electronics Co., Ltd. was coupled to an integrating sphere. The integrating sphere was placed over the blue LED. The substrate with the light conversion layer was placed between the blue LED and the integrating sphere. After the blue LED was turned on, a spectrum and an illuminance at each wavelength were measured.

The external quantum efficiency was determined from the spectrum and illuminance measured with the measuring apparatus, as described below. This value is indicative of the fraction of light (photons) incident on the light conversion layer and radiated as fluorescence toward the observer. Thus, a larger value is indicative of a better light conversion layer, and this value, together with S (PL), is an important performance index.

External quantum efficiency of red-light-emitting light conversion layer=P (Red)/E (Blue)×100(%)

External quantum efficiency of green-light-emitting light conversion layer=P (Gleen)/E (Blue)×100(%)

E (Blue), P (Red), and P (Gleen) have the following meanings.

E (Blue):

E (Blue) represents the total value of "illuminance×wavelength/hc" at a wavelength in the range of 380 to 490 nm, wherein h denotes the Planck constant, and c denotes the speed of light. (This value corresponds to the number of photons observed.)

P (Red):

P (Red) represents the total value of "illuminance×wavelength/hc" at a measurement wavelength in the range of 490 to 590 nm. (This value corresponds to the number of photons observed.)

P (Gleen):

P (Gleen) represents the total value of "illuminance× wavelength/hc" at a measurement wavelength in the range of 590 to 780 nm. (This value corresponds to the number of photons observed.)

On the basis of the above, EQE was calculated. EQE in Example 2 was taken as 10, and relative EQE of the sample measured was rated as described below.

<Evaluation Criteria> less than 10: D

10: C more than 10 and 100 or less: B more than 100: A

[Evaluation of Bubbles]

The ink was transferred with a liquid transfer pump. Bubbles in a tube were visually observed.

[Evaluation of Water Content]

The water content was measured with a Karl Fischer moisture meter (model number CA-06, manufactured by Mitsubishi Chemical Corporation, with a vaporization unit VA-06 manufactured by Mitsubishi Chemical Corporation).

TABLE 1

|  |  | Example 1 | Example 2 | Comparative example 1 |
|---|---|---|---|---|
| Ink composition (g) | QD (red-light-emitting) | 1.29 | — | 1.29 |
|  | QD (green-light-emitting) | — | 1.29 | — |
|  | Epoxy monomer | LDO 5.18 | Same as on the left | Ethylene glycol diglycidyl ether 6.99 |
|  | Oxetane monomer | OXT-221 1.81 | Same as on the left | — |

TABLE 1-continued

|  | Example 1 | Example 2 | Comparative example 1 |
|---|---|---|---|
| Water content (ppm) | 18 | 18 | 830 |
| Log P value of photopolymerizable compound | LDO 1.35 OXT-221 2.02 | Same as on the left | Ethylene glycol diglycidyl ether −1.31 |
| EQE | B | C | D |
| Evaluation of bubbles | No bubbles | No bubbles | Formation of bubbles |
| Note (characteristics of level) | Deoxidation with nitrogen and subsequent decrease in amount of dissolved oxygen | | Exposure to atmosphere |

Example 3

First, a substrate (BM substrate) with a light-shielding portion referred to as a black matrix (BM) was produced through the following procedures. A black resist ("CFPR BK" manufactured by Tokyo Ohka Kogyo Co., Ltd.) was applied to a glass substrate ("OA-10G" manufactured by Nippon Electric Glass Co., Ltd.) composed of non-alkali glass and was subjected to prebaking, pattern exposure, developing, and post-baking, thereby forming a patterned light-shielding portion. In the exposure, the black resist was irradiated with ultraviolet light at a light exposure of 250 mJ/cm$^2$. The pattern in the light-shielding portion corresponded to a 200 μm×600 μm sub-pixel, had an opening, and had a linewidth of 20 μm and a thickness of 2.6 μm.

The red-light-emitting ink composition produced in Example 1 was then applied to the opening in the BM substrate by an ink jet method, was irradiated with ultraviolet light, and was then heated in a nitrogen atmosphere at 150° C. for 30 minutes. The ink composition was cured and formed a pixel unit formed of the cured product of the ink composition. The pixel unit converts blue light to red light. The pixel unit had a thickness of 2.1 μm. A patterned light conversion filter was produced by the above operations.

Example 4

A BM substrate was prepared in the same manner as in Example 3. The red-light-emitting ink composition produced in Example 1 and the green-light-emitting ink composition produced in Example 2 were then applied to the opening in the BM substrate by an ink jet method, were irradiated with ultraviolet light, and were cured in the same manner as in Example 3. Thus, a pixel unit that converts blue light to red light and a pixel unit that converts blue light to green light were formed on the BM substrate. A patterned light conversion filter with multiple types of pixel units was produced by the above operations.

REFERENCE SIGNS LIST 10 pixel unit, 10a first pixel unit, 10b second pixel unit, 10c third pixel unit, 11a first light-emitting nanocrystal particles, 11b second light-emitting nanocrystal particles, 12a first light-scattering particles, 12b second light-scattering particles, 20 light-shielding portion, 30 light conversion layer, 40 substrate, 100 color filter

The invention claimed is:

1. An ink composition for an ink jet, the ink being for use in a color filter, the ink composition comprising:
   5% or more by mass of light-emitting nanocrystal particles;
   1% or more by mass of light-scattering particles;
   a polymer dispersant having a weight-average molecular weight of 750 to 100,000 and a functional group with an affinity with the light-scattering particles; and
   a photopolymerizable compound, wherein the photopolymerizable compound has a Log P value in the range of −1.0 to 6.5.

2. The ink composition according to claim 1, comprising a molecular sieve.

3. The ink jet ink composition according to claim 1, wherein the photopolymerizable compound is a radical photopolymerizable compound.

4. The ink jet ink composition according to claim 1, wherein the photopolymerizable compound is not soluble in an alkali aqueous solution.

5. The ink jet ink composition according to claim 1, wherein a film which is not soluble in an alkali aqueous solution can be formed.

6. The ink jet ink composition according to claim 1, wherein the ink jet ink composition has a surface tension in the range of 20 to 40 mN/m.

7. The ink jet ink composition according to claim 1, further comprising an organic solvent with a boiling point of 180° C. or more.

8. A light conversion layer comprising a cured product of the ink composition according to claim 1.

9. A light conversion layer comprising a cured product of the ink composition according to claim 1, wherein the light conversion layer is alkali-insoluble.

10. A light conversion layer comprising a plurality of pixel units,
   wherein the plurality of pixel units include a pixel unit containing a cured product of the ink jet ink composition according to claim 1.

11. The light conversion layer according to claim 8, further comprising:
   a light-shielding portion between the plurality of pixel units,
   wherein the plurality of pixel units include
   a first pixel unit that contains the cured product and light-emitting nanocrystal particles that absorb light with a wavelength in the range of 420 to 480 nm and emit light with an emission peak wavelength in the range of 605 to 665 nm, and
   a second pixel unit that contains the cured product and light-emitting nanocrystal particles that absorb light with a wavelength in the range of 420 to 480 nm and emit light with an emission peak wavelength in the range of 500 to 560 nm.

12. The light conversion layer according to claim 8, wherein
   the plurality of pixel units further include a third pixel unit with a light transmittance of 30% or more at a wavelength in the range of 420 to 480 nm.

13. A color filter comprising the light conversion layer according to claim 8.

14. An ink composition for an ink jet, the ink composition comprising:
- 5% or more by mass of light-emitting nanocrystal particles;
- 1% or more by mass of light-scattering particles;
- a polymer dispersant having a weight-average molecular weight of 750 to 100,000 and a functional group with an affinity with the light-scattering particles; and
- a photopolymerizable compound, wherein the photopolymerizable compound has a Log P value in the range of −1.0 to 6.5, and wherein the ink composition has a water ($H_2O$) content of 90 ppm or less measured with a Karl Fischer moisture meter.

15. The ink composition according to claim 14, wherein the water ($H_2O$) content is 20 ppm or less.

16. A method for producing the ink jet ink composition according to claim 1, comprising removing dissolved gas from the ink composition under reduced pressure.

17. The method for producing the ink composition according to claim 16, wherein a photopolymerizable compound dehydrated with a molecular sieve is used.

* * * * *